United States Patent
Nammi et al.

(10) Patent No.: US 9,503,237 B2
(45) Date of Patent: Nov. 22, 2016

(54) METHOD AND APPARATUS FOR CONVEYING DEMODULATION PILOT INFORMATION IN A MULTI ANTENNA WIRELESS COMMUNICATION SYSTEM

(71) Applicants: Sairamesh Nammi, Stockholm (SE); Bo Göransson, Sollentuna (SE); Erik Larsson, Uppsala (SE)

(72) Inventors: Sairamesh Nammi, Stockholm (SE); Bo Göransson, Sollentuna (SE); Erik Larsson, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 392 days.

(21) Appl. No.: 13/879,273

(22) PCT Filed: Mar. 26, 2013

(86) PCT No.: PCT/SE2013/050336
§ 371 (c)(1),
(2) Date: Apr. 12, 2013

(87) PCT Pub. No.: WO2013/176597
PCT Pub. Date: Nov. 28, 2013

(65) Prior Publication Data
US 2014/0328255 A1  Nov. 6, 2014

Related U.S. Application Data

(60) Provisional application No. 61/650,717, filed on May 23, 2012, provisional application No. 61/646,066, (Continued)

(51) Int. Cl.
*H04W 4/00* (2009.01)
*H04L 5/00* (2006.01)
*H04L 25/02* (2006.01)

(52) U.S. Cl.
CPC ............ *H04L 5/005* (2013.01); *H04L 25/0224* (2013.01)

(58) Field of Classification Search
CPC ............................ H04L 25/0224; H04L 5/005
(Continued)

(56) References Cited

U.S. PATENT DOCUMENTS 6,430,414 B1 * 8/2002 Sorokine et al. ............. 455/442
2004/0042428 A1   3/2004 Hamalainen et al.
(Continued)

FOREIGN PATENT DOCUMENTS

EP   2 453 619 A1   7/2005
EP   2 257 017 A2   12/2010

OTHER PUBLICATIONS

U.S. Appl. No. 61/648,961 submitted on May 18, 2012.*
(Continued)

*Primary Examiner* — Faisal Choudhury

(57) ABSTRACT

A radio network node (28) comprises a transmitter/receiver (48, 82, 93) configured to communicate over an air interface (32) with a wireless terminal (30); a scheduler (46, 84); and a order signal determination means (46, 62, 84). The scheduler (46, 84) schedules pilot signals, including common pilot signals transmitted for channel estimation, for transmission over the air interface to the wireless terminal. The order signal determination means (46, 62, 84) is configured to make a selective determination whether additional pilot signals for data demodulation are also to be transmitted to the wireless terminal (30) in addition to the common pilot signals transmitted for the channel estimation. The wireless terminal (30) comprises a transmitter and receiver (50, 101, 112) and pilot selection means (68). The pilot selection means (68) is configured to make a determination regarding which pilot signals transmitted by the radio network node are to be utilized by the wireless terminal. The pilot signals transmitted by the radio network node include common pilot
(Continued)

signals transmitted for channel estimation and additional pilot signals transmitted for data demodulation.

28 Claims, 11 Drawing Sheets

Related U.S. Application Data filed on May 11, 2012, provisional application No. 61/646,129, filed on May 11, 2012, provisional application No. 61/650,784, filed on May 23, 2012.

(58) Field of Classification Search
USPC .......................................................... 370/329
See application file for complete search history.

(56) References Cited

U.S. PATENT DOCUMENTS

| | | | | |
|---|---|---|---|---|
| 2006/0013338 | A1* | 1/2006 | Gore et al. ..................... | 375/324 |
| 2006/0018287 | A1* | 1/2006 | Walton et al. ................. | 370/334 |
| 2006/0171342 | A1* | 8/2006 | Dateki ................ | H04W 52/286 |
| | | | | 370/311 |
| 2007/0263734 | A1* | 11/2007 | Seki .............................. | 375/259 |
| 2009/0257387 | A1* | 10/2009 | Gholmieh ............. | H04L 5/0053 |
| | | | | 370/329 |
| 2011/0111781 | A1* | 5/2011 | Chen et al. .................... | 455/507 |
| 2011/0116569 | A1* | 5/2011 | Vaughan .............. | H04B 1/0483 |
| | | | | 375/295 |
| 2012/0182895 | A1* | 7/2012 | Jwa ............................... | 370/252 |
| 2013/0308553 | A1* | 11/2013 | Cozzo ................... | H04L 1/0027 |
| | | | | 370/329 |

OTHER PUBLICATIONS

Provisional application 61/648,961 has been submitted as NPL.*
3GPP TS 25.212 v11.1.0, 3$^{rd}$ Generation Partnership Project; Technical Specification Group Radio Access Network; "Multiplexing and channel coding (FDD)", (Release 11), Mar. 2012.
3GPP TS 25.214 v.11.0.0, 3$^{rd}$ Generation Partnership Project; Technical Specification Group Radio Access Network; "Physical layer procedures (FDD)" (Release 11), Mar. 2012.
RP-111393, "New WI: Four Branch MIMO transmission for HSDPA", Ericsson, 3GPP TSG-RAN meeting #53, Fukuoka, Japan, Sep. 13-16, 2011.
R1-111763, "4-branch MIMO for HSDPA", Ericsson, 3GPP TSG-RAN WG1 Meeting #65, Barcelona, Spain, May 9-13, 2011.
R1-120352, "Common Pilot Design for Four branch MIMO System", Ericsson, 3GPP TSG-RAN WG1 Meeting #68, Dresden, Germany, Feb. 6-10, 2012.
R1-122810, "Overall Summary of Pilot Design Schemes in Four branch MIMO System", Ericsson, 3GPP TSG-RAN WG1 Meeting #69, Prague, Czech Republic, May 21-25, 2012.
R1-120687, "Further Considerations and Simulations for Pilot Design", Huawei, HiSilicon, 3GPP TSG-RAN WG1 Meeting #68, Dresden, Germany, Feb. 6-10, 2012.
R2-121737, "UE categories for Four Brance MIMO", Ericsson, 3GPP TSG RAN WG2 Meeting #77bis, Jeju, South Korea, Mar. 26-30, 2012.
R1-111336, "LS on further enhancements for CELL_FACH", 3GPP TSG-RAN WG1 Meeting #65, Barcelona, Spain, May 9-13, 2011.
RP-111375, "HSDPA Multiflow Data Transmission", Qualcomm Inc, Orange, Nokia Siemens Networks, Ericsson, ST-Ericsson, T-Mobile USA, Alcatel-Lucent, Huawei, 3GPP TSG-RAN meeting #53, Fukuoka, Japan, Sep. 13-16, 2011.
RP-111642, "MIMO with 64QAM for HSUPA", Nokia Siemens Networks, 3GPP TSG-RAN meeting #54, Berlin, Germany, Dec. 6-9, 2011.
3GPP TSG-RAN WG1 #70, R1-123754, Ericsson, "Remaining Issues in the Pilot Design Schemes in Four Branch MIMO System", Qingdao, P.R. of China, Aug. 13-17, 2012.
3GPP TSG-RAN WG1 #69, R1-122808, Ericsson, "Scheduled Common Pilot Performance in a Four Branch MIMO System", Prague, Czech Republic, May 21-25, 2012.
International Search Report and Written Opinion mailed Jul. 24, 2013 in PCT Application No, PCT/SE2013/050336.

* cited by examiner

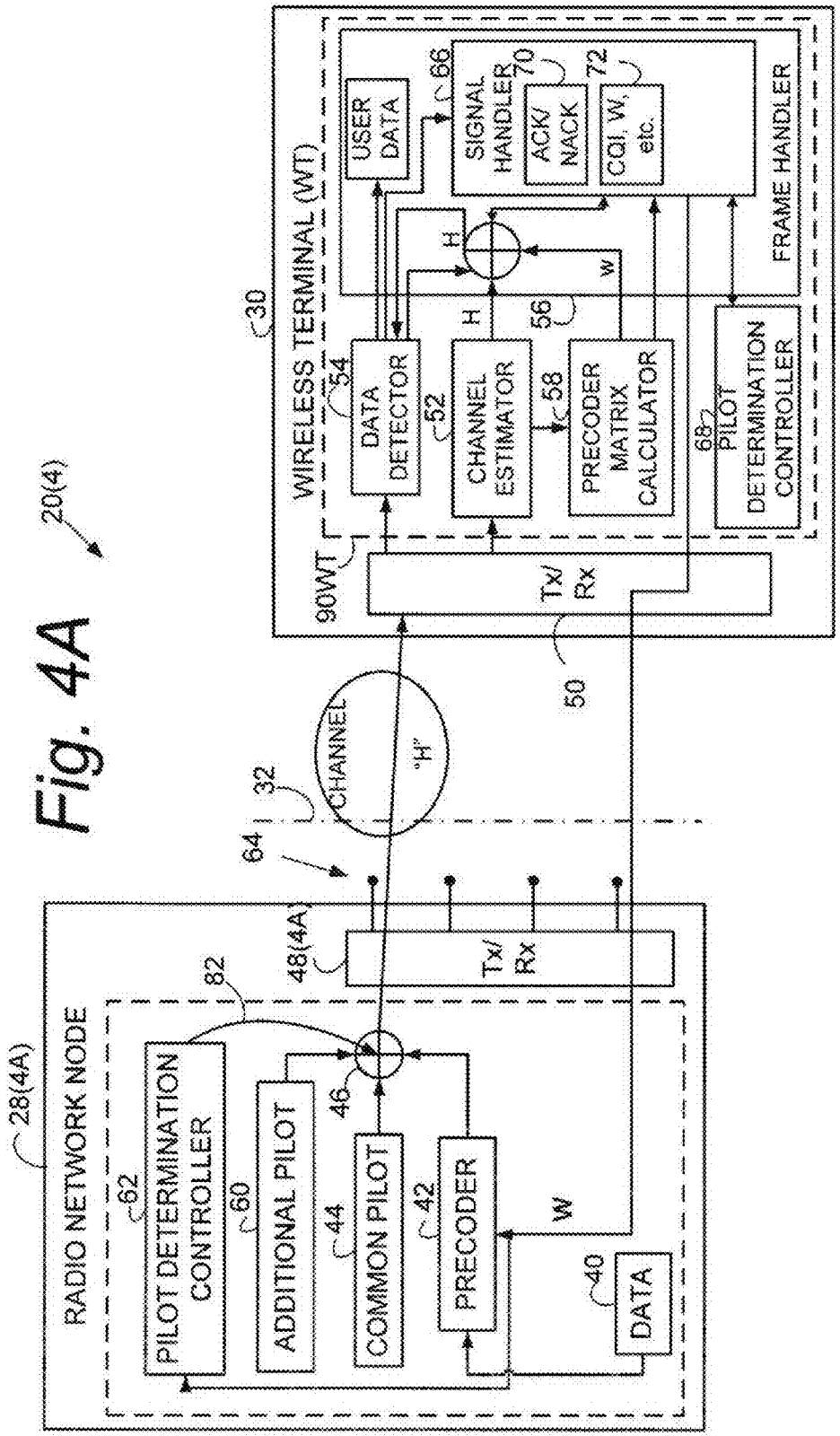

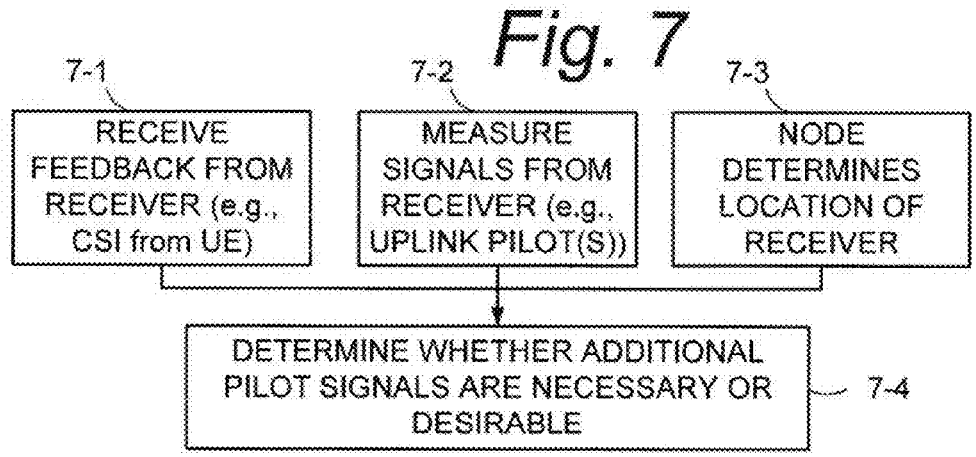
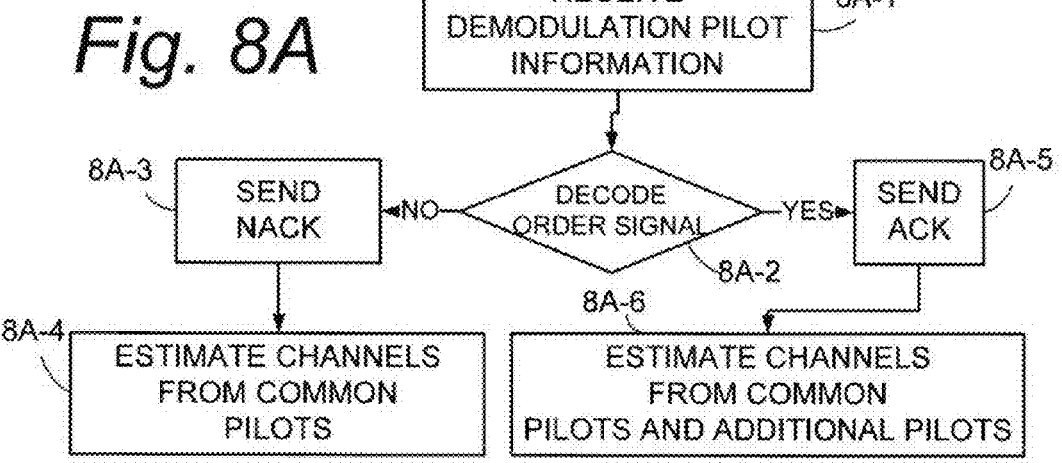
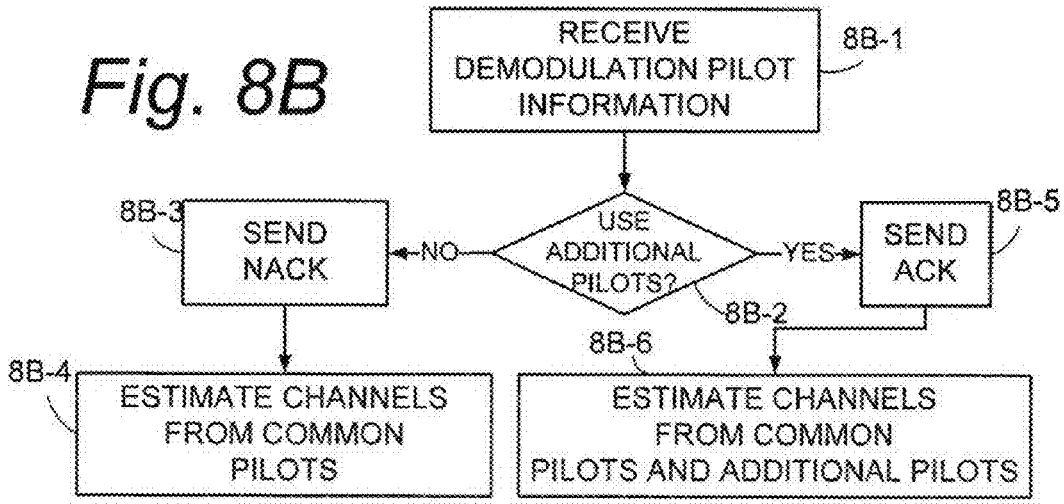

METHOD AND APPARATUS FOR CONVEYING DEMODULATION PILOT INFORMATION IN A MULTI ANTENNA WIRELESS COMMUNICATION SYSTEM

This application claims the priority and benefit of the following Patent Applications, all of which are incorporated herein by reference in their entirety
(1) U.S. Provisional Patent Application 61/650,717, filed May 23, 2012, entitled "METHOD AND APPARATUS FOR CONVEYING DEMODULATION PILOT INFORMATION IN A MULTI ANTENNA WIRELESS COMMUNICATION SYSTEM";
(2) U.S. Provisional Patent Application 61/646,066, filed May 11, 2012 entitled "METHOD AND APPARATUS FOR TRANSMITTING DEMODULATION PILOTS IN A MULTI ANTENNA WIRELESS COMMUNICATION SYSTEM";
(3) U.S. Provisional Patent Application 61/646,129, filed May 11, 2012, entitled "METHOD AND APPARATUS FOR DETECTING PILOT CONFIGURATION IN A MULTI ANTENNA WIRELESS COMMUNICATION SYSTEM" filed on May 11, 2012;
(4) U.S. Provisional Patent Application 61/650,784, filed on May 23, 2012, entitled "METHOD AND APPARATUS FOR COMPUTING CHANNEL STATE INFORMATION WITH MULTIPLE PILOTS IN A MULTI ANTENNA WIRELESS COMMUNICATION SYSTEM".
(5) This application is the U.S. national phase of international Application No. PCT/SE2013/050336 filed Mar. 26, 2013 which designated the U.S.

TECHNICAL FIELD

The technical field of the present disclosure generally relates to conveying information related to demodulation pilots in a multi antenna wireless communication system.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Universal Terrestrial Radio Access Network (E-UTRAN) are defined for the $3^{rd}$ Generation Partnership Project (3GPP).

The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has an essentially "flat" architecture comprising radio base station nodes without reporting to radio network controller (RNC) nodes.

The International Telecommunications Union-Radio communications sector (ITU-R) has specified a set of requirements for 4G standards, named the International Mobile Telecommunications Advanced (IMT-Advanced) specification. ITU-R has also stated that Mobile WiMAX and LTE, as well as other beyond-3G technologies that do not fulfill the IMT-Advanced requirements, could nevertheless be considered "4G", provided they represent forerunners to IMT-Advanced compliant versions and have a substantial level of improvement in performance and capabilities with respect to the initial third generation system.

In order that a network such as 3G LTE system may maintain synchronization and the system may manage the different types of information that is carried between the base station and the UE, a frame structure has been defined. There are two types of LTE frame structures, e.g., Type 1 for LTE frequency division duplex and Type 2 for LTE time division duplex. The basic Type 1 LTE frame has an overall length of 10 ms. This is then divided into a total of 20 individual slots. An LTE subframe has two slots, so that there are ten LTE subframes within a frame. The LTE Type 2 frames are somewhat different: the 10 ms frame comprises two half frames, each 5 ms long. The LTE half-frames are further split into five subframes, each 1ms long.

Network multiple-input and multiple-output (MIMO) and collaborative MIMO have been proposed for LTE. With a MIMO system, the data stream from a single user is demultiplexed into $N_{tx}$ separate sub-streams. Each sub-stream is then encoded into channel symbols. A data modulation rate, either same or adaptive, is imposed on the sub-streams of the transmitters. The signals are received by $N_{rx}$ receive antennas. With a MIMO system consisting of $n_T$ transmit antennas and $n_R$ receive antennas, the channel matrix is written as shown in Expression (1).

$$H = \begin{bmatrix} h_{11} & \cdots & h_{1n_T} \\ h_{21} & \cdots & h_{2n_T} \\ \cdots & \cdots & \cdots \\ h_{n_R1} & \cdots & h_{n_R n_T} \end{bmatrix} \qquad \text{Expression (1)}$$

where

-continued $$h_{ij} = \alpha + j\beta \quad \text{Expression (2)}$$

$$= \sqrt{\alpha^2 + \beta^2} \cdot e^{j\arctan\frac{\beta}{\alpha}} \quad \text{Expression (3)}$$

$$= |h_{ij}| \cdot e^{j\phi_{ij}}. \quad \text{Expression (4)}$$

Indeed, LTE and WiMAX utilize Multiple-Input Multiple-Output (MIMO) transmission schemes to increase spectral efficiency. MIMO schemes assume that the transmitter and receiver are both equipped with multiple antennas, and that multiple modulated and precoded signals are transmitted on the same "time-frequency resource element". In MIMO technology, mathematically the transmitted signal for a particular frequency/time resource element (k,l) can be expressed by Expression (1).

$$x(k,l) = W(k)s(k,l) \quad \text{Expression (5)}$$

In Expression (5), s is a vector with elements $S_i$, i=1, ..., $N_s$, and where $S_i$ is a modulated symbol and $N_s$ is the number of transmitted layers; W(k) is the so-called precoding matrix of dimension $N_{tx} \times N_s$, where $N_{tx}$ is the number of transmitted antennas; x is a vector of transmitted signals, where $x_i$, i=1, ..., $N_{tx}$, is the signal transmitted from the ith transmit antenna. As used herein, "k" and "l" are the frequency and time indices, respectively, and each element in vectors x and s are given for a particular frequency/time. The signal is transmitted over a channel which can be characterized by a channel matrix H, the channel matrix H being of dimension $N_{rx} \times N_{tx}$, where $N_{tx}$ is the number of transmitted antennas and Nr is the number of received antennas. In general, the rank of the channel matrix is given by rank(H)=k≤min{Nrx,Ntx}. The received signal vector is then an Nrx dimensional vector given by Expression (5).

$$y = Hx + e = HWs + e \quad \text{Expression (6)}$$

In Expression (6), e is a noise and interference vector, with covariance matrix Re.

Factors to consider for MIMO include: geographical separation of antennas, selected coordinated multi-point processing approach (e.g., coherent or non-coherent), and coordinated zone definition (e.g., cell-centric or user-centric). Depending on whether the same data to a UE is shared at different cell sites, collaborative MIMO includes single-cell antenna processing with multi-cell coordination, or multi-cell antenna processing.

High Speed Downlink Packet Access (HSPA) enhances the WCDMA specification with High Speed Downlink Packet Access (HSDPA) in the downlink and Enhanced Dedicated Channel (E-DCH) in the uplink. HSDPA achieves higher data speeds by shifting some of the radio resource coordination and management responsibilities to the base station from the radio network controller. Those responsibilities include one or more of the following: shared channel transmission, higher order modulation, link adaptation, radio channel dependent scheduling, and hybrid-ARQ with soft combining.

High Speed Downlink Packet Access (HSPA) employs a transport channel and three physical channels. The High Speed Downlink Shared Channel (HS-DSCH) is a downlink transport channel shared by several UEs. The HS-DSCH is associated with one downlink DPCH, and one or several physical channels. The following physical channels have been defined for HSDPA: High Speed Physical Downlink Shared Channel (HS-PDSCH); High Speed Dedicated Physical Control Channel (HS-DPCCH); and the High Speed Shared Control Channel (HS-SCCH). The HS-PDSCH is a downlink channel which is both time and code multiplexed. The HS-DPCCH is an uplink channel that carries the acknowledgements of the packet received on HS-PDSCH and also the CQI (Channel Quality Indication). The HS-SCCH is a fixed rate downlink physical channel used to carry downlink signaling related to HS-DSCH transmission. The HS-SCCH provides timing and coding information, thus allowing the UE to listen to the HS-DSCH at the correct time and using the correct codes to allow successful decoding of UE data.

To support the transmission of downlink and uplink transport channels, there is a need for certain associated downlink (DL) control signaling. This control signaling is often referred to as downlink (DL) L1/L2 control signaling, indicating that the corresponding information partly originates from the physical layer (Layer 1) and partly from Layer 2 (Medium Access Control [MAC]). Downlink A1l/L2 control signaling consists of downlink (DL) scheduling assignments, including information required for the terminal to be able to properly receive, demodulate, and decode the DL-SCH on a component carrier, uplink scheduling grants informing the terminal about the resources and transport format to use for uplink (UL-SCH) transmission, and hybrid ARQ acknowledgments and response to UL-SCH transmissions. In addition, the control downlink signaling can also be used for transmission of power-control commands for power control of uplink physical channels, as well as for certain special purposes such as MBSFN notifications. The downlink L1/L2 control signaling is transmitted within the first part of each subframe. Thus, each subframe can be said to be divided into a control region followed by a data region, where the control region corresponds to the part of the subframe in which the L1/L2 control signaling is transmitted. To simplify the overall design, the control region always occupies an integer number of OFDM symbols.

HS-SCCH orders exist in HSPA as a fast L1/L2 control signaling complement to higher layer (Radio Resource Control [RRC]) signaling. By using a special format of the HS-SCCH, it is possible to convey orders to a UE without having to resort to slow higher layer signaling. Currently there are orders specified for (de)activation or triggering of the following features (See section 4.6C in Reference [1] and sections 6A.1, 6B, 6C.4 and 10.5 in Reference [2] for details):

UE DTX (de)activation (orders introduced in Rel-7);
UE DRX (de)activation (orders introduced in Rel-7);
HS-SCCH-less operation (de)activation (orders introduced in Rel-8);
Enhanced serving cell change triggering (orders introduced in Rel-8);
Secondary downlink carrier (de)activation in MC-HS-DPA (orders introduced in Rel-8, Rel-9, Rel-10 and Rel-11);
Secondary uplink carrier (de)activation in DC-HSUPA (orders introduced in Rel-9); and
Switching between UL transmit diversity activation states (orders introduced in Rel-11).

New HS-SCCH orders are being considered within an ongoing Rel-11 work item as indicated in R1-111336. See, e.g., Reference [9]. New HS-SCCH orders may also be considered within other ongoing Rel-11 work items such as described in RP-111393, RP111375 and RP111-642. See, e.g., Reference [3], Reference [10], and Reference [11].

Currently, a four Tx transmissions scheme for HSDPA (high speed downlink packet access) is discussed within 3GPP for standardization. See, e.g., Reference [3]-Reference [5]. Previous versions of the specification support up to 2Tx antenna transmissions from the network side where common pilots (e.g., CPICH) are transmitted from each Tx branch.

To support four Tx MIMO transmissions, it is necessary to obtain four channel estimates in order to characterize each of the spatial layers, which means that more pilots will be necessary. The common pilots are used for two main functions: (1) channel state information (CSI) estimation through channel sounding where rank, CQI and PCI are estimated; and (2) channel estimation for demodulation purposes.

For a four-branch MIMO, the following approaches are possible: (a) common pilots for both CSI and channel estimation for data demodulation; and (b) common pilots for CSI estimation and additional pilots for channel estimation for data demodulation. Sometimes the common pilots for CSI estimation are referred to as the $1^{st}$ and $2^{nd}$ common pilots, whereas the "additional" pilots are referred to as the 3rd and 4th common pilots.

As used herein, "common pilots" refer to pilot signals that are made available to all user equipments (UE) and which are transmitted without UE-specific beam forming. Common pilots may be transmitted at instances in which legacy UEs (Release 7 MIMO and Release 99), that are not able to demodulate 4Tx transmissions, are scheduled. These legacy UEs cannot make use of the energy in the 3rd and 4th common pilots. Also the energy made available in the 3rd and 4th pilots reduces the amount of energy available for HS-PDSCH scheduling to the legacy UEs. Moreover, the 3rd and 4th common pilots can cause interference to these legacy UEs, which at best can make use of the 1st and 2nd common pilots. Therefore, to minimize performance impacts to non 4Tx UEs, it is desirable that the power of at least the 3rd and 4th common pilots be reduced to a low value.

A solution based only on common pilots will have a negative impact on the legacy UEs unless the powers on the 3rd and 4th common pilots are minimal. However, if the powers are minimal, then the demodulation performance of 4Tx UEs will be adversely impacted.

FIG. 1 and FIG. 2 show example link level throughputs as a function of pilot powers on 3rd and 4th pilots for a non-legacy UE with three different geometries for 4×4 MIMO and 4×2 MIMO systems. In FIG. 1 and FIG. 2, the pilot powers for the 1st and 2nd pilots are maintained at −10 and −13 dB, respectively. It can be observed, e.g., in FIG. 1 and FIG. 2, that as the 3rd and 4th pilot powers are reduced, the performance of the non-legacy UE degrades. The degradation is severe at a high C/I (e.g., at 20 dB). This is because at high C/I, there is a high probability of rank 3 and rank 4 transmissions and/or high data rates, which require a larger amount of pilot power energy. On the other hand, low data rates and/or rank selections, which occur at low C/I (e.g., 0 dB) can be demodulated with a lower amount of pilot energy. Thus, high pilot power is desirable when a UE is to demodulate high data rates with high rank.

It has been proposed to introduce scheduled pilots, which are additional pilots on the 3rd and 4th antennas transmitted only when a 4-branch capable UE is scheduled. See Reference [7]. Introduction of the additional pilots when any 4 branch MIMO user is scheduled is likely to cost additional overhead without providing benefit for all the scenarios. In reality, a high amount of pilot power is required when the UE is to demodulate high data rates with high rank. But as described above, high pilot powers can negative impact the legacy UEs. The impact can be substantial if the 4-branch UEs are scheduled fairly often.

Another drawback with the additional pilots is that they are transmitted even if a UE does not support high rank (e.g., 3 and 4) signals. It can be expected that not all UEs capable of receiving a 4-branch transmission will support multiplexing of up to 4 layers. In Reference [8], the proposed UE categories are listed. Most likely, there will be 4-branch UEs capable of receiving at most 2 layers (also known as 4×2 MIMO). Since these UEs will not be able to receive the very high bit rate that can be provided if 4 layers are transmitted, the need for the additional pilots for demodulation is not as urgent. Hence it is recommended that Node B use these additional pilots only under certain conditions. See e.g., Reference [6].

SUMMARY

In one of its aspects the technology disclosed herein concerns a radio network node comprising a transmitter and receiver configured to communicate over an air interface with a wireless terminal; a scheduler; and a pilot determination controller (also known as pilot signal determination means or determination means). The scheduler is configured to schedule pilot signals, including common pilot signals transmitted for channel estimation, for transmission over the air interface to the wireless terminal. The pilot determination controller is configured to make a determination, e.g., a selective determination, whether additional pilot signals for data demodulation are also to be transmitted to the wireless terminal in addition to the common pilot signals transmitted for the channel estimation. The pilot determination controller may comprise or be included in the scheduler, and both the pilot determination controller and the scheduler may be realized by electronic circuitry.

In an example embodiment and mode the pilot signal determination means is configured to make the selective determination based on location of one or more wireless terminals served by the radio network node.

In an example embodiment and mode the pilot signal determination means is configured to make the selective determination based on downlink channel quality information (CQI, SNR, SINR, BER) for one or more wireless terminals served by the radio network node. The downlink channel quality information may include one or more of channel quality indicator (CQI), signal to noise ratio (SNR), signal to interference and noise ratio (SINR), and block error rate (BER).

In an example embodiment and mode the pilot signal determination means is configured to make the selective determination based on uplink signal strength of an uplink signal transmitted from one or more wireless terminals served by the radio network node.

In an example embodiment and mode the pilot signal determination means is configured to make the selective determination based on modulation rate and code rate assigned to one or more wireless terminals served by the radio network node.

In an example embodiment and mode the radio network node is configured to transmit to the wireless terminal an order signal that the additional pilot signals for data demodulation are also to be transmitted to the wireless terminal. In an example implementation the radio network node is configured to transmit to the wireless terminal the additional pilot signals for data demodulation upon receiving from the wireless terminal an acknowledgement of the order signal. In an example implementation the radio network node is configured to transmit the order signal to the wireless terminal over a High Speed Shared Control Channel (HS-SCCH) the determination order signal that the additional pilot signals for data demodulation are to be transmitted to the wireless terminal.

In an example embodiment and mode the scheduler is configured to schedule the additional pilot signals for data demodulation for transmission to the wireless terminal on a High Speed Physical Downlink Shared Channel (HS-PDSCH).

In an example embodiment and mode the pilot signal determination means is configured to make a separate determination with respect to each of plural wireless terminals whether order signal is to be transmitted to the respective wireless terminal. In an example implementation the pilot signal determination means is configured to make the separate determination with respect to each of the plural wireless terminals based on respective different criteria. In an example implementation the different criteria comprises: (a) location of one or more wireless terminals served by the radio network node; (b) downlink channel quality information for one or more wireless terminals served by the radio network node; (c) an uplink signal transmitted from one or more wireless terminals served by the radio network node; (d) modulation rate and code rate assigned to one or more wireless terminals served by the radio network node; and (e) a combination of two or more of (a), (b), (c), and (d).

In an example embodiment and mode the pilot signal determination means is configured to make a collective determination whether the additional pilot signals for data demodulation are to be transmitted to plural wireless terminals served by the radio network node, the collective determination being based a tradeoff of benefit against detriment of use of the additional pilots for data demodulation by the plural wireless terminals.

In another of its aspects the technology disclosed herein concerns a wireless terminal comprising a transmitter and a receiver, configured to communicate over an air interface with a radio network node, and electronic circuitry. The electronic circuitry is configured to make a determination regarding which pilot signals transmitted by the radio network node are to be utilized by the wireless terminal. The pilot signals transmitted by the radio network node include common pilot signals transmitted for channel estimation and additional pilot signals transmitted for data demodulation.

In an example embodiment and mode the electronic circuitry is configured to make the determination based on reception capability of the wireless terminal.

In an example embodiment and mode the electronic circuitry is configured to make the determination based on cost of usage of the additional pilot signals transmitted for data demodulation.

Also disclosed are methods, including a method in a radio network node (e.g., operating a radio network node) and a method in a wireless terminal (e.g., operating a wireless terminal).

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 4A, FIG. 4B, and FIG. 4C are schematic views showing details of example implementations of the example system of FIG. 4.

FIG. 7 is a flowchart illustrating an example process to determine whether to use additional pilots.

FIG. 8A and FIG. 8B are flowcharts illustrating example methods performed by a wireless terminal.

DETAILED DESCRIPTION

Figure 1:
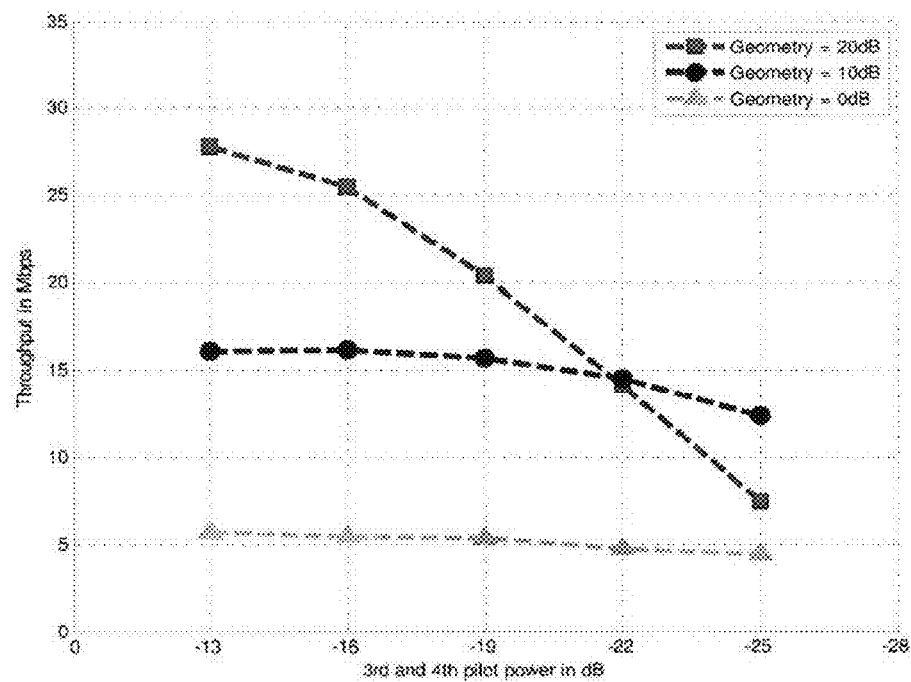
FIG. 1 is a graphical view depicting example link level performance when common pilots are used for both CSI estimation and data demodulation for a 4×4 MIMO system.
Figure 2:
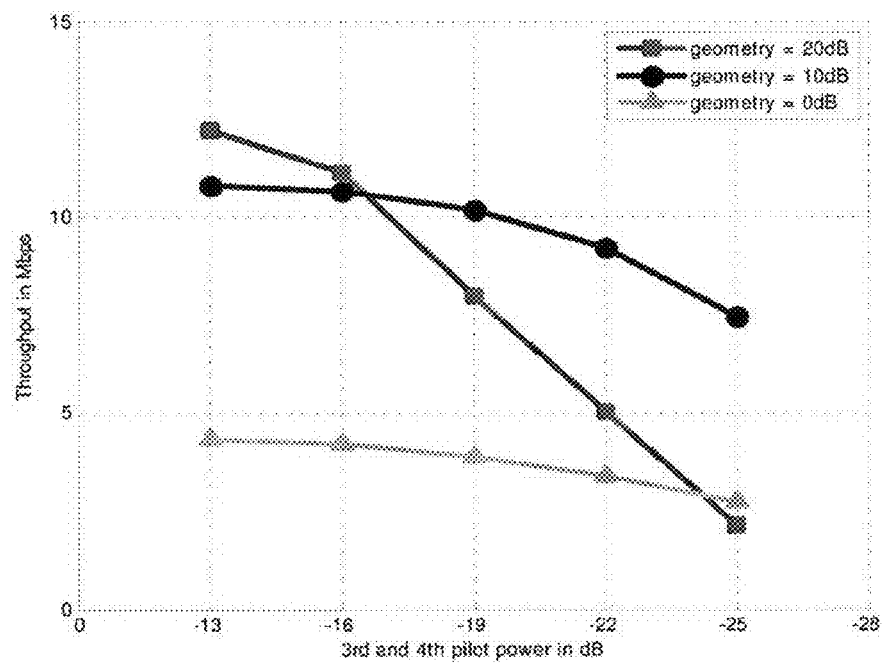
FIG. 2 is a graphical view depicting example link level performance when common pilots are used for both CSI estimation and data demodulation for a 4×2 MIMO system.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The following terminologies may be used in the disclosure for consistency and simplicity. The technology described herein may apply to a heterogeneous network comprising network.

As used herein, the term "node" may encompass nodes using any technology including, e.g., high speed packet access (HSPA), long term evolution (LTE), code division multiple access (CDMA)2000, GSM, etc. or a mixture of technologies such as with a multi-standard radio (MSR) node (e.g., LTE/HSPA, GSM/HS/LTE, CDMA2000/LTE etc). Furthermore the technology described herein may apply to different types of nodes e.g., base station, eNode B, Node B, relay, base transceiver station (BTS), donor node serving a relay node (e.g., donor base station, donor Node B, donor eNB), supporting one or more radio access technologies.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

One or more non-limiting aspects of the technology disclosed herein addresses some or all of the issues described above with respect to the conventional solutions. Exemplary techniques are described herein in which a radio network node (e.g., radio base station (RBS), eNB, eNodeB, NodeB, etc.) may transmit the additional pilots to one or more wireless terminals (e.g., mobile terminal, UE, etc.) for data demodulation based on one or more parameters. Otherwise, the radio network node may transmit only the common pilots for the data demodulation.

As understood from the discussion above, legacy common pilots transmitted on legacy antenna branches (e.g., $1^{st}$ and $2^{nd}$ branches) and low power common pilots transmitted on non-legacy branches (e.g., $3^{rd}$ and $4^{th}$ branches) should be sufficient for both CSI estimation and for data demodulation when lower ranks and/or lower data rates are scheduled.

However, when high data rates are scheduled, additional pilot energy should be provided to enable the wireless terminal to make high quality channel estimates appropriate for data demodulation. For example, this effect can be especially pronounced when 64QAM (quadrature amplitude) modulation is used. Preferably, according to the technology disclosed herein, the wireless terminal is informed about which pilots to use for demodulation.

Without loss of generality, one or more aspects of the subject matter of the technology disclosed herein are described in detail for explanation purposes. These aspects not intended to be limiting.

As mentioned above, pilot design schemes can generally be divided into (1) a scheme of using common pilots for CSI estimation and for data demodulation, and (2) a scheme of using common pilots for CSI estimation and also using additional pilots for data demodulation.

Figure 3:
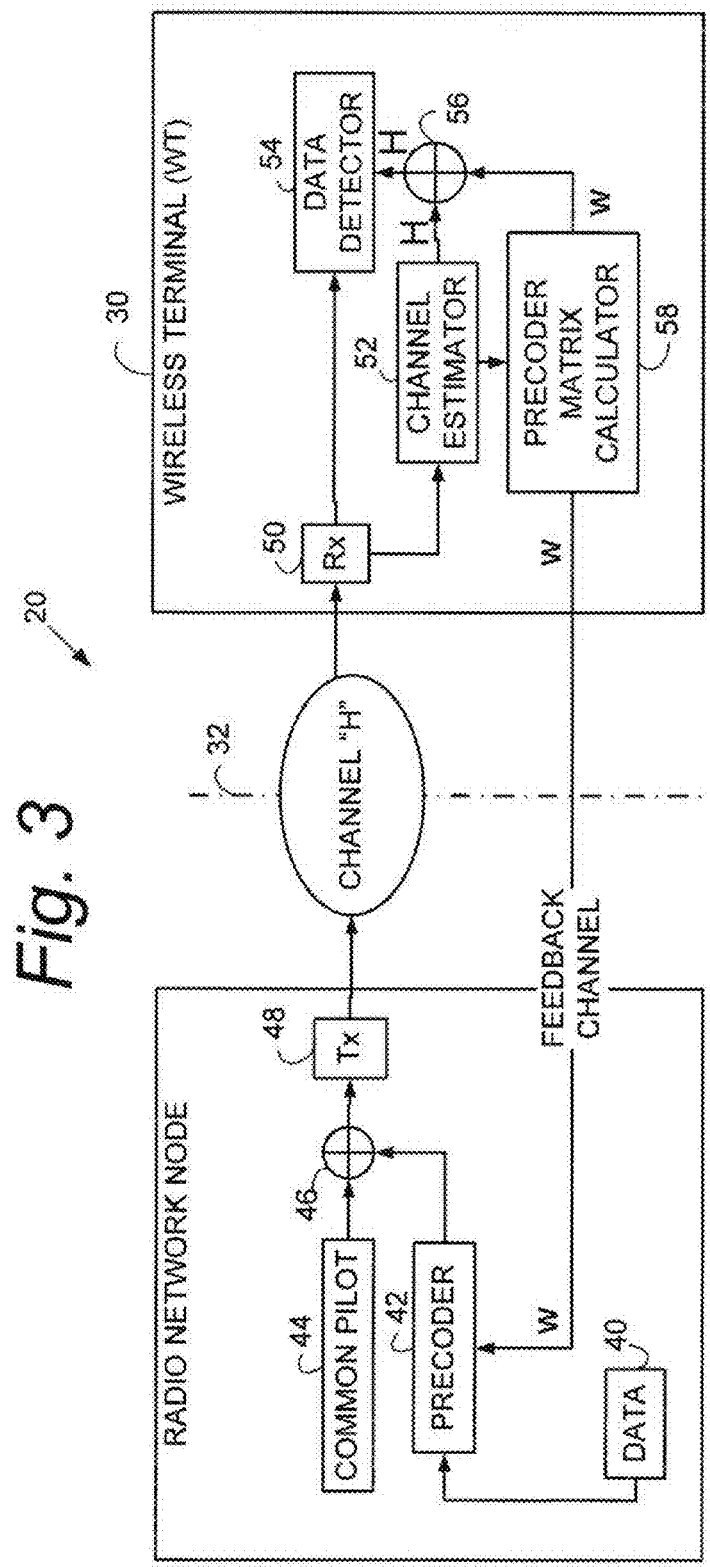
FIG. 3 is a schematic view of an example system with common pilots for CSI estimation and data demodulation.

FIG. 3 shows an example communications system 20 wherein an example common pilot design is implemented, e.g., common pilots for CSI estimation and data demodulation. FIG. 3 shows both a radio network node 28 and a wireless terminal 30. The radio network node 28 and the wireless terminal 30 communicate over a radio or wireless interface 32, and particularly over a channel H. Other example embodiments of the radio network node are also illustrated herein, and are sometimes suffixed with a bracketed numeral corresponding to figure number. Unless otherwise indicated, any reference to "radio network node 28" is intended to refer to or encompass example embodiments of the radio network node, with or without such suffix.

The radio network node 28 comprises or is connected to a source of data 40. The radio network node 28 comprises precoder 42; common pilot source 44; scheduler 46; and transmitter (Tx) 48. The precoder 42 receives the data from source 44 and generates precoded data. The scheduler 46 receives both the precoded data and common pilots and, using, e.g., the precoded data and common pilots, generates a frame, block, or other logical grouping of information which is applied to the transmitter 48. In FIG. 3, "Tx" is shown to be transmitter 48 of a radio network node 28.

The wireless terminal 30 of FIG. 3 comprises receiver (Rx) 50; channel estimator 52; data detector 54; frame handler/processor 56; and precoder matrix calculator 58. The receiver (Rx) 50 receives transmissions from the transmitter (Tx) 48 of radio network node 28 over channel H, and applies the received transmissions to both channel estimator 52 and data detector 54. The channel estimator 52 generates a channel estimate which is applied to frame handler/processor 56, to data detector 54, and to precoder matrix calculator 58. The precoder matrix calculator 58 generates a precoder matrix w which is applied on a feedback channel to precoder 42 of radio network node 28. In FIG. 3, "Rx" is shown to be receiver 50 of wireless terminal 30.

As understood from FIG. 3, the radio network node 28 may transmit common pilot symbols (from common pilot source 44) for channel estimation for channel sounding, and may do so on all antennas (e.g., on four antennas in the case of a four antenna system). The wireless terminal 30 may estimate a channel quality (e.g., signal to interference and noise ratio [SINR]) from the channel sounding, and may compute a preferred precoding matrix and channel quality index (CQI) for the next downlink transmission. The wireless terminal 30 may convey this information to the radio network node 28 through a feedback channel.

The radio network node 28 may process the feedback information from the wireless terminal 30 and determine the precoding matrix, modulation, coding rate, and other parameters such as transport block size, and so on. The radio network node 28 may convey this information to the wireless terminal 30 through a downlink control channel. The radio network node 28 then may transmit data to the wireless terminal 30 with the modulation and coding rate indicated in the downlink control channel. The radio network node 28 may pre-multiply the data by a precoding vector/matrix before passing the data to the antenna ports. The wireless terminal 30 may estimate the channel for data demodulation also from the common pilot symbols.

In one of its aspects the technology disclosed herein concerns a radio network node comprising a transmitter and a receiver configured to communicate over an air interface with a wireless terminal and a processor. The processor is configured to schedule pilot signals, including common pilot signals transmitted for channel estimation, for transmission over the air interface to the wireless terminal. The processor is configured to make a determination, e.g., a selective determination, whether additional pilot signals for data demodulation are also to be transmitted to the wireless terminal in addition to the common pilot signals transmitted for the channel estimation.

Figure 4:
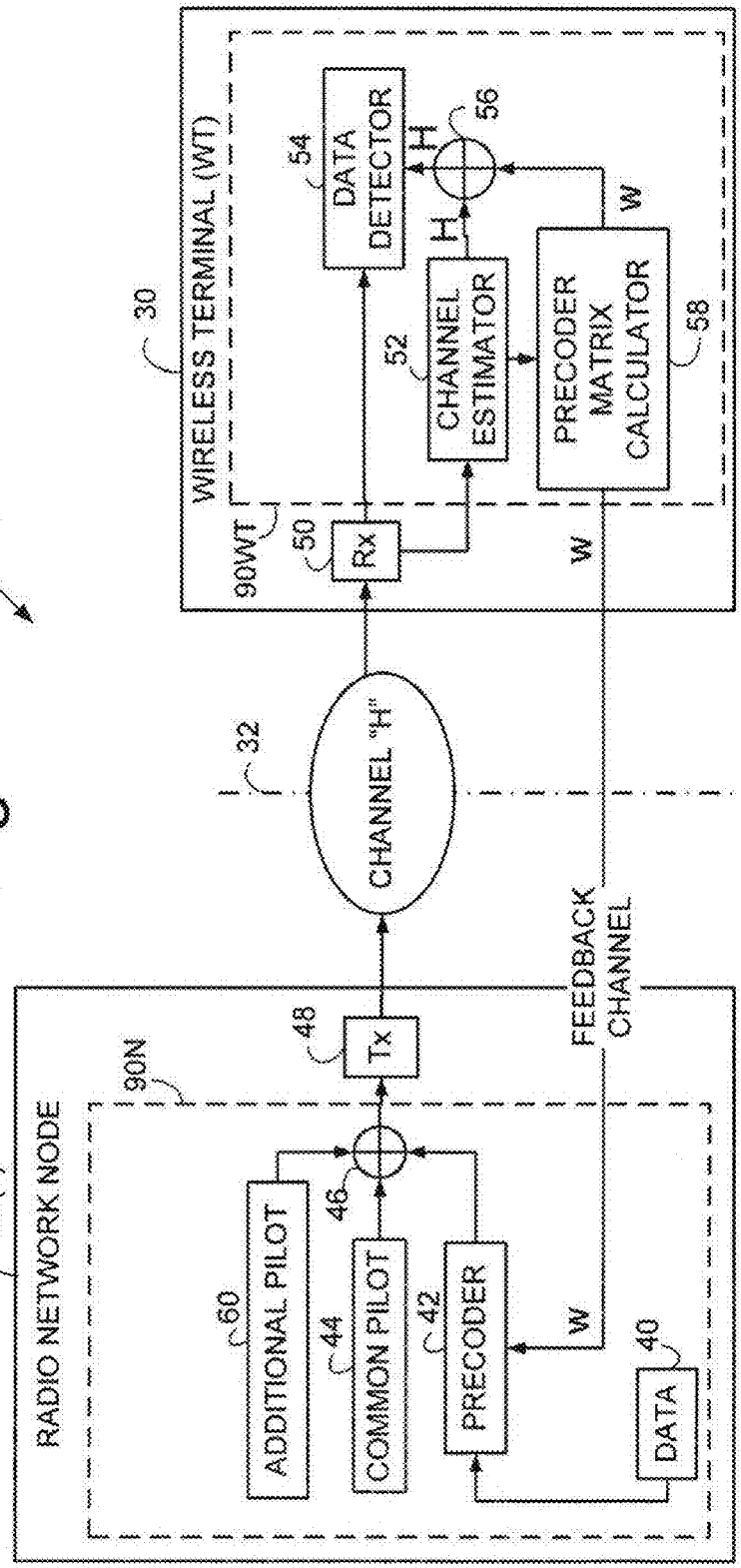
FIG. 4 is a schematic view of an example system with common pilots and additional pilots.

FIG. 4 illustrates a communications system 20(4) comprising radio network node 28(4) and wireless terminal 30. As in communications system 20 of FIG. 3, the radio network node 28(4) comprises source of data 40; precoder 42; common pilot source 44; scheduler 46; and transmitter (Tx) 48. In addition, radio network node 28(4) comprises a source of additional pilot signals 60 which applies the additional pilots which may be used for data demodulation to scheduler 46. As in the FIG. 3 embodiment, wireless terminal 30 comprises receiver (Rx) 50; channel estimator 52; data detector 54; frame processor 56; and precoder matrix calculator 58.

The radio network node 28(4) may transmit known pilot symbols (e.g., from common pilot source 44) for estimation of channels for the channel sounding. The wireless terminal 30 may convey back to the radio network node 28(4) the preferred precoding matrix, CQI, through the feedback channel. The radio network node 28(4) may use the feedback information, and may choose the precoding matrix, CQI, and the transport block size. For data transmission, the base station may multiply the data by the chosen precoding matrix and transmit the multiplied data. In the FIG. 4 embodiment, in addition to the data, the radio network node 28(4) may transmit the additional pilots (from the source of additional pilot signals 60) from all or some of the antennas (e.g., $3^{rd}$ and/or $4^{th}$ antennas). Thus, in a four antenna system in which there are common pilot signals for channel estimation transmitted on each antenna, inclusion of additional pilots for data demodulation results in six pilot signals being transmitted. The additional pilots effectively increase pilot powers transmitted from the antennas (e.g., the $3^{rd}$ and $4^{th}$ antennas), which allows more accurate channel estimation to be made for data demodulation. The wireless terminal 30, and particularly channel estimator 52, may estimate the channels for data demodulation from these additional pilots in addition to the common pilots which are used for channel estimation.

FIG. 4A illustrates a particular example implementation of the communications system of FIG. 4, showing in more detail how the additional pilots from source of additional pilot signals 60 may be included. The radio network node 28(4A) of FIG. 4A also comprises source of data 40; precoder 42; common pilot source 44; scheduler 46; and transmitter (Tx)/receiver (Rx) 48(4A), and further illustrates that inclusion of the additional pilots may be facilitated by pilot determination controller 62. The pilot determination controller 62 is also known as radio network node "pilot signal determination means", "pilot selection means", or "pilot determination processor" or "processor" or similar appellation and, as explained herein, may be implemented using electronic circuitry. Moreover, the pilot determination controller 62 may comprise or be included in the scheduler, or vise versa. The radio network node 28(4A) is configured to make a selective determination whether additional pilot signals for data demodulation (from source 60 of additional pilot signals) are also to be transmitted to the wireless terminal 30 in addition to the common pilot signals transmitted (from common pilot source 44) for the channel estimation. For sake of fuller illustration, FIG. 4A also illustrates that the radio network node 28(4A) comprises multiple antennas, e.g., four antennas 64.

The wireless terminal 30 of FIG. 4A comprises units and functionalities similar to that of the example embodiment of FIG. 4, but are shown in more detail in FIG. 4A for an example implementation. The frame handler/processor 56 of FIG. 4A is shown as comprising signal handler 66 and an optional pilot determination controller 68. The signal handler 66 processes both signals received on the downlink from the radio network node and prepares signals for transmission on the uplink to the radio network node, including signals that are carried by channels which are defined with respect to the frame that is transmitted over the radio interface. In the example embodiment of FIG. 4A the signal handler includes an ACK/NACK generator 70 and a feedback generator 72. In one example embodiment, such as that understood with respect to FIG. 8A, the ACK/NACK generator 70 generates either an ACK or a NACK decision depending on whether the wireless terminal is capable of decoding the order signal. In another example embodiment, such as that understood with respect to FIG. 8B, the ACK/NACK generator 70 may also base its ACK/NACK decision on whether the wireless terminal desires to use the additional modulation pilots. The feedback generator 72 generates one or more feedback signals, to be carried by appropriate uplink channels over the frame, to the radio network node. Such feedback signals, or feedback information, may comprise, for example, the CQI and proposed precoder (or indication thereof) which is calculated by the precoder matrix calculator 58. Some example embodiments, such as that of FIG. 8B, include the pilot determination controller 68. The pilot determination controller 68 includes logic which the wireless terminal may employ to determine whether, when ordered to do so, the wireless terminal really wants to use the additional pilots for data demodulation. The pilot determination controller 68 is also known as the wireless terminal "pilot selection means", or "pilot determination processor" or "processor" or similar appellation and, as explained herein, may be implemented using electronic circuitry.

Thus, in one or more aspects of the technology disclosed herein, the radio network node (e.g., NodeB) may transmit common pilots to the wireless terminal (e.g., UE) for CSI estimation. For data demodulation, the radio network node may transmit additional pilots in addition to the common pilots. The additional pilots, in one or more embodiments, may effectively increase the pilot powers transmitted from one or more antennas.

Figure 4B:
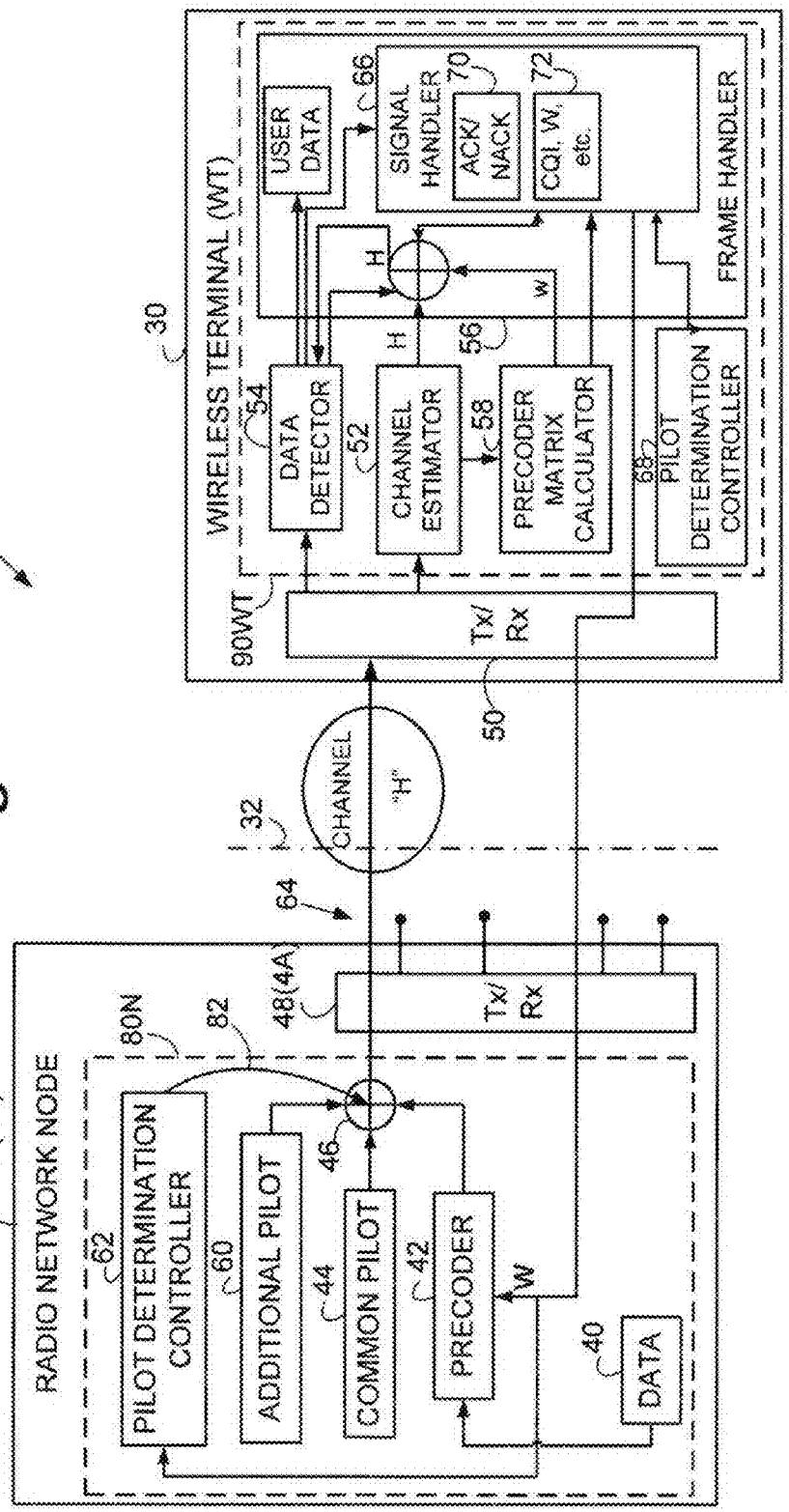

FIG. 4A illustrates in non-exhaustive and non-limiting fashion that a decision whether to include the additional pilots may be implemented through a unit or functionality such as pilot determination controller 62, also known as the "pilot selection means" or "pilot determining means". FIG. 4B further shows that the pilot determination controller 62 and various other components or elements of the radio network node 28 may comprise or be included in a machine platform 80NT. To this end FIG. 4, FIG. 4A, and FIG. 4B employ a broken line to represent machine platform 80NT which, at least in some example embodiments, comprises pilot determination controller 62. The terminology "machine platform" is a way of describing how the functional units of node 28 may be implemented or realized by machine. The machine platform 80 can take any of several forms, such as (for example) electronic circuitry in the form of a computer implementation platform or a hardware circuit platform. A computer implementation of the machine platform may be realized by or implemented as one or more computer processors or controllers as those terms are herein expansively defined, and which may execute instructions stored on non-transient computer-readable storage media. In such a computer implementation the machine platform 80 may comprise, in addition to a processor(s), a memory section (which in turn can comprise random access memory; read only memory; an application memory (a non-transitory computer readable medium which stores, e.g., coded non instructions which can be executed by the processor to perform acts described herein); and any other memory such as cache memory, for example). Another example platform 80 suitable for pilot determination controller 62 is that of a hardware circuit, e.g., an application specific integrated circuit (ASIC) wherein circuit elements are structured and operated to perform the various acts described herein. FIG. 4B likewise shows how various units or functionalities of wireless terminal 30 (including but not limited to pilot determination controller 68, also known as pilot selection means) may also be included in a machine platform 80WT.

FIG. 4A shows by arrow 82, that the pilot determination controller 62, also known as the pilot determination processor or "processor", either comprises (e.g., is included in) or governs/controls the scheduler 46 for directing whether the additional pilot signals (e.g., from source 60 of additional pilot signals) are to be included in an information frame or the like transmitted by the radio network node 28(4A) to wireless terminal 30. As understood herein, the pilot determination controller 62 may comprise (be included in) the scheduler 46, or the pilot determination controller 62 may be considered a separate functionality that cooperates with the scheduler 46 for determining whether to include the additional pilots for data demodulation in the information frame. The person skilled in the art understands that use of the additional pilots for data demodulation requires additional output power, and use of power by the additional pilots for data demodulation needs to be taken into consideration by the scheduler 46.

The radio network node, and particularly a unit such as pilot determination controller 62, may choose the additional pilots based on one or more parameters. For example, the selective determination whether additional pilot signals for data demodulation may depend on one or more of the following:

location of one or more wireless terminals served by the radio network node.

downlink channel quality information (CQI, SNR, SINR, BER) for one or more wireless terminals served by the radio network node. The downlink channel quality information may include one or more of channel quality indicator (CQI), signal to noise ratio (SNR), signal to interference and noise ratio (SINR), and block error rate (BER).

uplink signal strength of an uplink signal transmitted from one or more wireless terminals served by the radio network node.

modulation rate and code rate assigned to one or more wireless terminals served by the radio network node.

For example, in one example embodiment and mode, when the wireless terminals are near to a center of the cell (center being defined as the location of the radio network node), the additional pilots may be transmitted for data demodulation. Otherwise, the common pilots may be sufficient for data demodulation.

Figure 5:
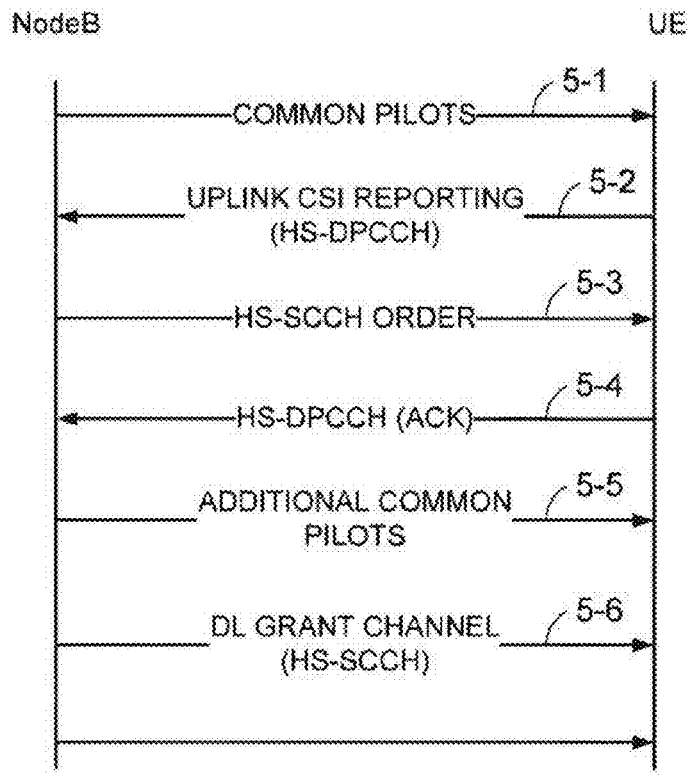
FIG. 5 is a diagrammatic view of an example message sequence to convey demodulation pilot information.

FIG. 5 shows an example message sequence according to an aspect of the technology disclosed herein. As shown by act 5-1 in FIG. 5, the radio network node 28 may transmit the common pilots continuously for CSI estimation. The wireless terminal 30 may compute the channel state information such as the channel quality information (CQI), precoding control index (PCI), and rank information (RI) through these channels, and report back to radio network node 28 in an uplink feedback channel (e.g., HS-DPCCH) as depicted by act 5-2. Once the feedback information is received, the radio network node 28 can determine whether only the common pilots are sufficient for demodulation, or whether the additional pilots are also desirable. As mentioned above, the determination can be made on parameters such as SNR, SINR, block error rate (BLER), wireless terminal location, modulation and code rate, and so on. In some embodiments the pilot determination controller 62 may make such determination, in other embodiments the determination may be entrusted to a unit such as a scheduler.

If it is determined that the additional pilots are needed or desirable, the radio network node may convey information indicative of the need to use the additional pilots to the wireless terminal as reflected by act 5-3. In one example embodiment, the demodulation pilot information, also known as a signaling order or order signal(s) or determination signal, may be conveyed through separate signaling such as using HS-SCCH orders (special bit pattern for switching on demodulation pilots) which are included in the frame of information transmitted over the channel H to the wireless terminal. If the wireless terminal is able to decode the order signal, the wireless terminal sends an acknowledgement (ACK) to the radio network node 28 over an appropriate uplink channel (e.g., HS-DPCCH) as shown by act 5-4. Then, upon receiving such acceptance, as act 5-5 the radio network may transmit the data, e.g., the additional common pilots also known as the additional pilots for data demodulation, on a downlink data channel (e.g., HS-PDSCH). The wireless terminal may use the additional pilots for demodulation until again informed by the radio network node. Act 5-6 reflects another or new order on the HS-SCCH which may reflect another determination regarding the additional pilots, e.g., a determination that the additional pilots are to be discontinued, for example.

Figure 6:
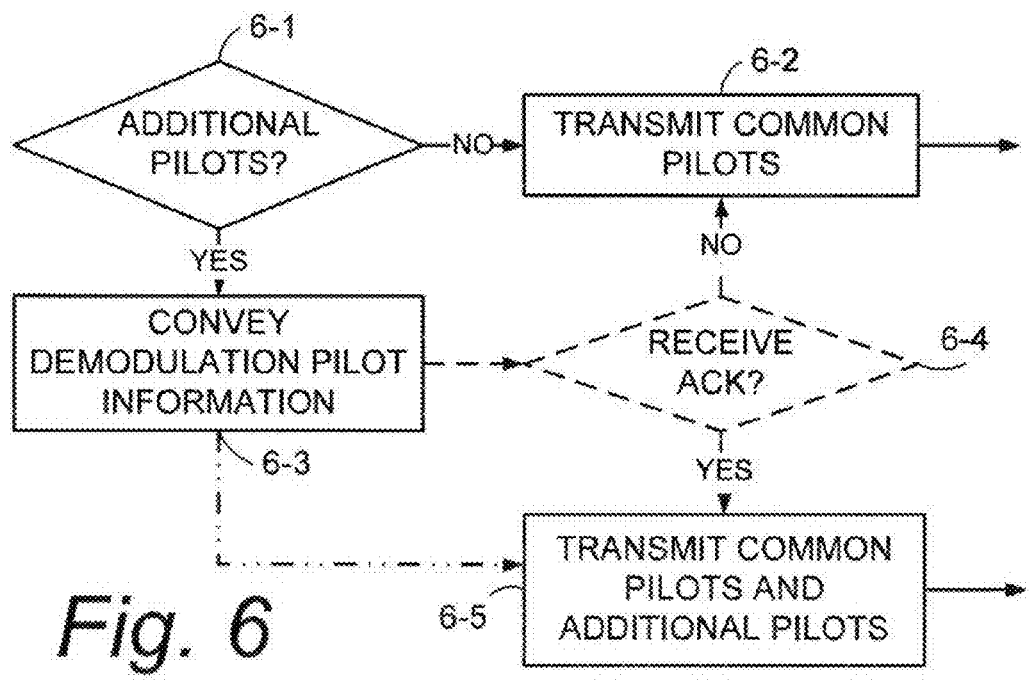
FIG. 6 is a flowchart illustrating an example method performed by a radio network node.

FIG. 6 illustrates an example method performed at a radio network node. Act 6-1 comprises the radio network making a determination whether additional pilots are desirable or necessary. As noted above, this determination can be made based on various parameters such as such as SNR, SINR, BER, wireless terminal location, modulation and code rate, and so on. If it is determined (e.g., by pilot determination controller 68) that the additional pilots are not necessary or desirable, as act 6-2 the radio network node transmits only the common pilots to the wireless terminal for demodulation purposes. On the other hand, if additional pilots are deemed beneficial or necessary (e.g., by pilot determination controller 62), as act 6-3 the radio network node conveys demodulation pilot information over the radio interface and thus notifies the wireless terminal that additional pilots are or will be available. Such notification may occur by the order signal described above. In performing act 6-3 the radio network node may notify the wireless terminal through separate signals in the control channels such as HS-SCCH orders. In one example embodiment, reflected by the dashed-double dotted line of FIG. 6, as act 6-5 the radio network node may immediately proceed to transmit both common and additional pilots for data demodulation to the wireless terminal. But in another example embodiment, reflected by the broken lines of FIG. 6, as act 6-4 the radio network node may wait for a response to the conveying of the demodulation pilot information, e.g., a response from the order signal sent as act 6-3. If either an NACK is received or no response is received for a predetermined period of time, the radio network node transmits only the common pilots to the wireless terminal for demodulation (act 6-2). But it is determined as a result of the check of act 6-4 that an ACK is received from the wireless terminal, the radio network node transmits the both the common and additional pilots to the wireless terminal for demodulation (act 6-5).

As mentioned above, in one of its aspects the technology disclosed herein determines whether additional pilots are desirable or necessary, an example of such an action being act 6-1 of FIG. 6. Such determination may be made by pilot determination controller 62. FIG. 7 shows in more detail an example process for making the determination whether or not to use the additional pilots. As mentioned previously, the radio network node (e.g., the scheduler or pilot determination controller 62) may make this determination in a multitude of ways.

One way of making the determination of whether to use additional pilots, represented by act 7-1 of FIG. 7, is through feedback provided from the wireless terminal. The feedback may be information relating to the quality of the channels as perceived by the wireless terminal. In one aspect and example embodiment, the for feedback purposes wireless terminal may report its CSI estimation (e.g., SNR, SINR, CQI, preferred coding matrix and rate, BLER, etc.) based on the common pilots transmitted by the radio network node for channel sounding purposes. Preferably, the wireless terminal reports back good CSI estimations over a period of time (e.g., high CQI for some number of TTIs) before concluding that additional pilots would be beneficial. In this regard, a wireless terminal which reports good CSI estimations over a period of time may be eligible for higher rate data demodulation and thus potentially deserving of receiving the additional pilots for data demodulation.

Alternatively or additionally, for act 7-1 the feedback may be information regarding location of the wireless terminal (e.g., it may be GPS capable), and the distance from the radio network node can be calculated. For example, the wireless terminal may be GPS-capable and as such may be able to provide a report of the location of the wireless terminal.

Rather than receiving feedback from the wireless terminal, another way or criteria to make the determination whether the additional pilots are necessary or desirable is for the radio network node to measure uplink signals transmitted from the wireless terminal, as depicted by act 7-2. Preferably, the uplink signal should be a signal whose strength at transmission is known to the radio network node. This may be a signal whose strength at transmission is predetermined (e.g., an uplink pilot) or is specified by the radio network node such as through transmit power control (TPC) commands. By comparing the received strength and the transmit strength of the uplink signal, the radio network node may determine whether it would be advantageous to use the additional pilots.

Another way or criteria to make the determination whether the additional pilots are necessary or desirable is for the radio network node itself to determine the location of the wireless terminal (e.g., through triangulation), as depicted by act 7-3.

Whether the information that is used for the determination is obtained from feedback act 7-1, uplink signal analysis act 7-2, location by node act 7-3, or other ways, or a combination of ways, the information is used as act 7-4 to make the determination whether the additional pilot signals are desirable or necessary. As understood from the foregoing, the determination of act 7-4 may be made by pilot determination controller 62.

Thus, as seen in FIG. 7, either or a combination of acts 7-1, 7-2, or 7-3 may be employed for obtaining input for the determination whether the additional pilots are to be used. That is, the radio network node may make the determination of act 7-4 based on the feedback alone (preferably made over time) [act 7-1], on the uplink measurements alone (preferably made over time) [act 7-2], on the basis of node or otherwise-determined location of the wireless terminal [act 7-3] or a combination of one or more of these different types of input information. Moreover, these listed inputs are not exhaustive, as other types of inputs to the determination of act 7-4 may be utilized.

The additional pilots for data demodulation are common in the sense that they are using the common spreading codes, and other wireless terminals can demodulate the additional pilots for data demodulation. The wireless terminal(s) that actually use the additional pilots for data demodulation are those which have been sent the order signal (e.g., a HS-SCCH order) to advise those wireless terminals specifically that the additional pilots for data demodulation exist and that those ordered wireless terminals are to receive and at least consider using the additional pilots for data demodulation. It may be, for example, that just one wireless terminal in the cell is ordered to receive and use the additional pilots for data demodulations. Upon receipt of an acknowledgement from that one wireless terminal, the additional pilots for data demodulation are transmitted over the air interface. As another example, plural wireless terminals in the cell may receive order signals which required those plural "ordered" wireless terminals to receive and use the additional pilots for data demodulations, those order signals being specifically addressed or otherwise determined by the wireless terminal to be applicable to the ordered wireless terminal. In some embodiments in which additional pilots for data demodulation are used for plural wireless terminals, a decision may be made individually for each wireless terminal whether such individual wireless terminal is to be sent an order signal respecting availability of the additional pilots for data demodulation, and such individual decision may be made on the basis of information unique to each wireless terminal. In other words, a separate determination is made with respect to each of plural wireless terminals whether the order signal is to be transmitted to the respective wireless terminal. In other embodiments in which additional pilots for data demodulation are used for plural wireless terminals, a collective determination or decision may be made based on a tradeoff of benefit against detriment of usage of the additional pilots for data demodulation.

It should be appreciated that other wireless terminals in the cell may have the hardware and capability to read the additional pilots for data demodulation, but may not be ordered or instructed to use the additional pilots for data demodulation for data demodulation purposes. In essence the additional pilots for data demodulation are not utilized by those non-ordered wireless terminals, e.g., the non-ordered wireless terminals are essentially oblivious to the transmission of the additional pilots for data demodulation.

FIG. 8A illustrates a flow chart of a first example method performed at a wireless terminal. Act 8A-1 comprises the wireless terminal receiving the demodulation pilot information (e.g., the order signal to use the additional pilots for data demodulation) from the radio network node. As act 8A-2 the wireless terminal determines whether it can successfully decode the demodulation pilot information (e.g., the order signal to use the additional pilots for data demodulation) as received at act 8A-1. If decoding of the order signal is not successful, as act 8A-3 the wireless terminal sends a NACK to the radio network node. Then, as act 8A-4, the wireless terminal proceeds to operate without the additional pilots for data demodulation, e.g., to estimate the channels from common pilots. If decoding of the order signal is successful so, the as act 8A-5 the wireless terminal sends an ACK to the radio network node and then uses both the common pilots for CSI estimation and the additional pilots for data demodulation.

FIG. 8B illustrates a flow chart of a second example method performed at a wireless terminal. Act 8B-1 comprises the wireless terminal receiving the demodulation pilot information (e.g., the order signal to use the additional pilots for data demodulation) from the radio network node. Act 8B-2 comprises the wireless terminal determining whether it can or will use the additional pilots for data demodulation. If no additional pilots can or are to be used, as act 8-3 the wireless terminal sends a NACK in response to the message carrying the demodulation pilot information (e.g., the order signal) from the radio network node. Then the wireless terminal estimates the channels from the common pilots alone (without the benefit of the additional pilots), as represented by act 8-4. A negative determination at act 8-2 and execution of acts 8-3 and 8-4 may occur when the wireless terminal is not in a position to use the additional pilots. For example, the wireless terminal may be a 4-branch wireless terminal but only capable of receiving at most 2 layers. As another example, if the high data rate service costs more money, the wireless terminal may have been set to not use such services. On the other hand, if it is determined at act 8-2 that the wireless terminal can use the additional pilots, as act 8-5 the wireless terminal sends an ACK message to the radio network node. Further, as act 8-6 the wireless terminal estimates the channel from the common and additional pilots, e.g., uses both the common pilots for CSI estimation and the additional pilots for data demodulation.

In an example embodiment if an ordered wireless terminal fails to return an acknowledgement of the order signal (as in the FIG. 8A example embodiment), or determines not to use the additional pilots for data demodulation (as in the FIG. 8B example embodiment), the radio network node continues to send the order signal to the previously non-acknowledging wireless terminal. In an example implementation, the radio network node does not necessarily require or force the ordered wireless terminal to use the additional pilots for data demodulation, as it is up to the ordered wireless terminal to determine whether or not the ordered wireless terminal will actually use this additional information (additional pilots for data demodulation) or not. In an example implementation the radio network node nevertheless continues to send the order signal to a non-acknowledging, previously ordered wireless terminal to encourage or provide the ordered wireless terminal with the opportunity to use the additional pilots for data demodulation.

Figure 4C:
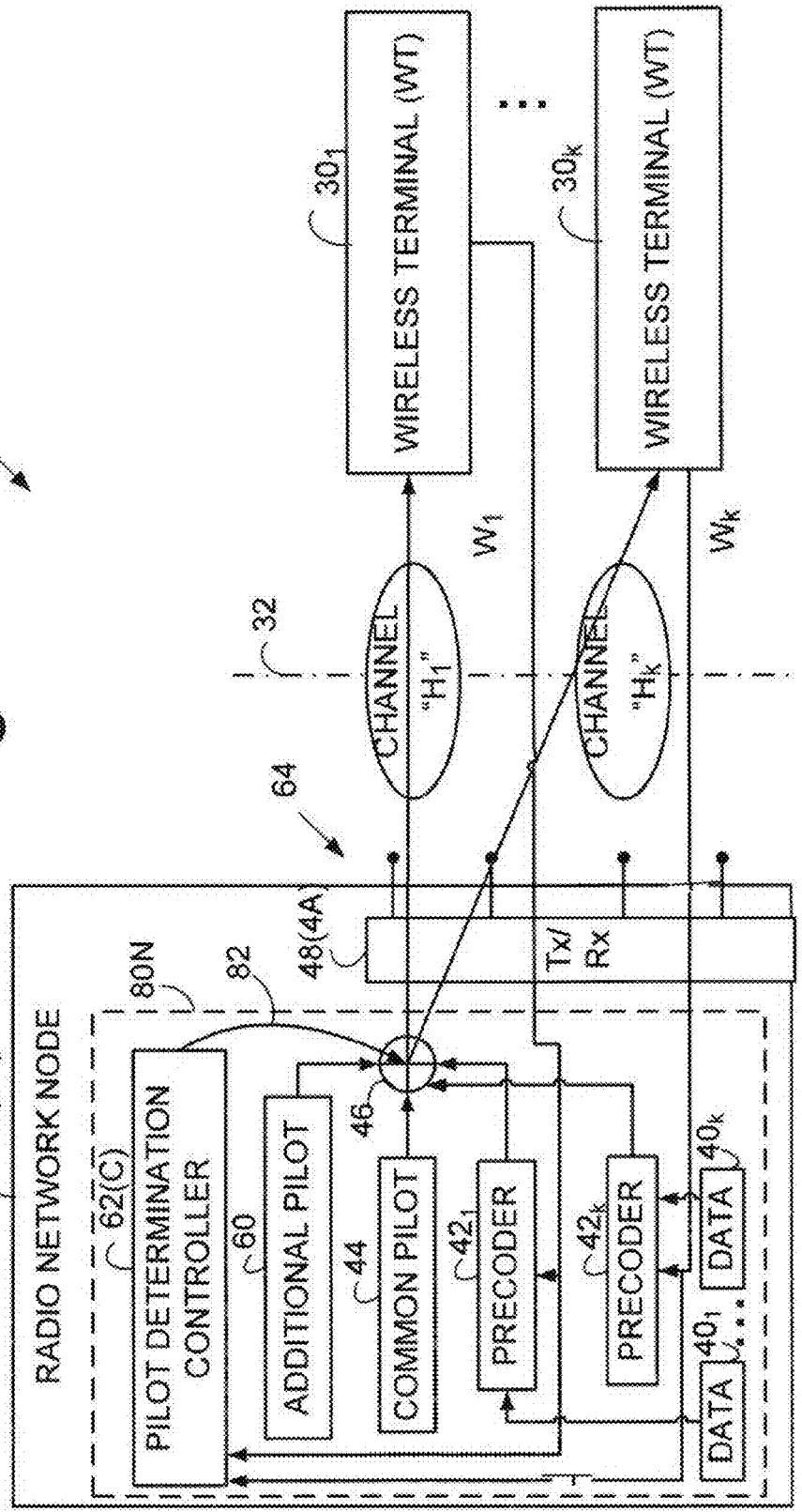
Figure 9A:
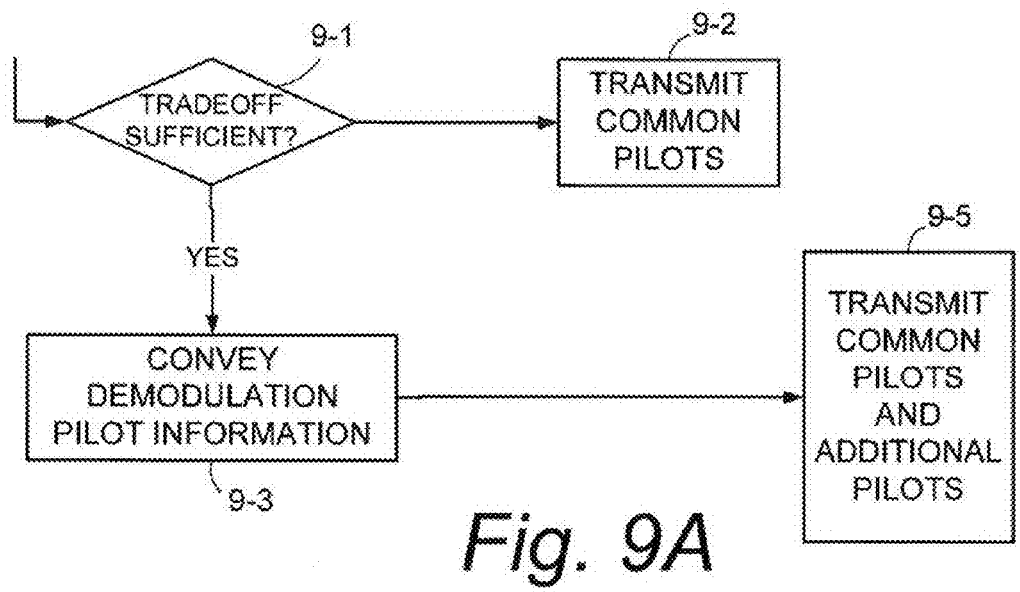
FIG. 9A and FIG. 9B are flowcharts illustrating example methods for conveying demodulation pilot information.

FIG. 4C and FIG. 9A (or FIG. 9B) illustrate a particular example implementation of the communications system of FIG. 4 wherein the radio network node 28, in serving any number of (e.g., plural) wireless terminals $30_1$-$30_k$ in a cell, makes a determination whether an expected tradeoff of providing additional pilots is sufficient to warrant transmitting the additional pilots for demodulation. In similar manner as FIG. 4A and FIG. 4B, radio network node 28(4C) of FIG. 4A also comprises source of data 40; precoder 42; common pilot source 44; scheduler 46; and transmitter (Tx)/receiver (Rx) 48(4C), and pilot determination controller 62C. Since an aspect of the example embodiment of FIG. 4C the pilot determination controller 62C (which also has other names, as previously mentioned) takes the multiple wireless terminals $30_1$-$30_k$ into consideration in determining whether to use additional pilots for demodulation, the radio network node 28(4C) is shown in FIG. 4C as comprising separate data sources $40_1$-$40_k$ and separate precoders $42_1$-$42_k$ for the corresponding wireless terminals $30_1$-$30_k$. Of course, radio network nodes including those of preceding embodiments typically serve plural wireless terminals, yet in the example embodiment of FIG. 4C the multiple wireless terminals $30_1$-$30_k$, rather than just one wireless terminal, are taken into consideration in determining whether to use additional pilots for demodulation. The multiple wireless terminals $30_1$-$30_k$ of FIG. 4C resemble those of the previous example embodiments, with each of the wireless terminals $30_1$-$30_k$ communicating with the radio network node 28(4C) over respective downlink channels $H_1$-$H_k$, and having respective feedback channels.

In an example embodiment such as that of FIG. 4C and FIG. 9A (or FIG. 9B), the radio network node may make a collective determination whether to use the additional pilots for data demodulations for one or more wireless terminals served by the radio network node. In this technique, the collective determination is based on a consideration of whether a number of wireless terminals in the cell may benefit from the use of the additional pilots for data demodulation without substantially detrimentally affecting conditions in the cell overall, e.g., a tradeoff of benefit against detriment of use of the additional pilots for data demodulation. For example, the collective determination may based on the plural separate determinations made with respect to each of the plural wireless terminals, e.g., determining that the number of wireless terminals in the cell that may benefit from the use of the additional pilots for data demodulation exceeds a threshold. Detriment may be based on or determined by uplink measurements, or by location of the wireless terminals (e.g., a determination whether the wireless terminal is at a cell center or cell edge, for example). Such threshold may be predetermined or adaptively determined. If the collective determination so warrants, the orders to use the additional pilots for data demodulation are sent to those wireless terminals which would benefit from use of the additional pilots for data demodulations, and the additional pilots for data demodulation are turned on (e.g., transmitted over the air interface). When the wireless terminals operate in accordance with an embodiment such as that illustrated by FIG. 8A, the ordered wireless terminals are then each expected to return an acknowledgement message to the radio network node, indicating that the ordered wireless terminals have received and successfully decoded the order signal. Upon reception of such an acknowledgement, the radio network node begins the transmission of the additional pilots for data demodulation.

FIG. 9A illustrates a first example method performed by the radio network node 28 when there can be any number of wireless terminals in the cell. Act 9-1 comprises the radio network node making a determination whether an expected tradeoff of providing additional pilots is sufficient to warrant transmitting the additional pilots for demodulation. In one example embodiment, the process illustrated in FIG. 9A may be performed for each wireless terminal, and the radio network node may determine whether the expected tradeoff is sufficient based on the results. The same way need not be used for all wireless terminals, e.g., different input information or different techniques may be utilized for making the determination of act 9-1. For example, feedback may be used for one wireless terminal, uplink measurements may be used for another, and both may be used for yet another wireless terminal.

If the radio network node determines as act 9-1 that the expected tradeoff is not sufficient (e.g., many wireless terminals near the cell edge and few near the cell center, there are too many legacy terminals, etc.), as depicted by act 9-2 the radio network node can transmit only the common pilots for data demodulation. On the other hand, if the expected tradeoff is determined to be sufficient (e.g., many terminals near the cell center and very few at the cell edge, very few legacy terminals to be negatively impacted, etc.), as act 9-3 the radio network node may convey the demodulation pilot information (e.g., the order signal) to the wireless terminals. In one embodiment, the radio network node can immediately proceed to transmit both common and additional pilots for data demodulation to the wireless terminal (act 9-5) as illustrated by the arrow connecting act 9-3 to act 9-5.

Figure 9B:
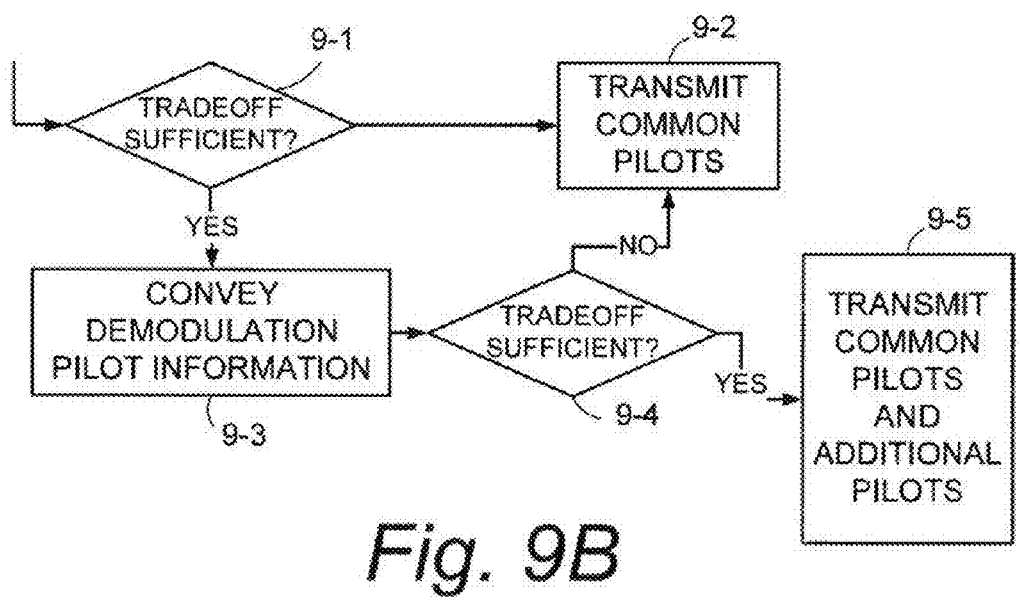

In yet another embodiment, and as illustrated by act 9-4 of FIG. 9B, the radio network node may make another determination (a "confirmatory determination") whether the expected tradeoff is sufficient. Recall that not every non-legacy wireless terminal may be in a position to use the additional pilots even though the conditions for use are favorable to the wireless terminal. Thus, in the example embodiment, the radio network node may wait for responses from the wireless terminals in the cell. If a sufficient number of ACKs are received within the predetermined period of time, the radio network node may transmit both the common and additional pilots as depicted by act 9-5. But if an insufficient number of ACKs are received, the radio network node can transmit the common pilots only.

Figure 10:
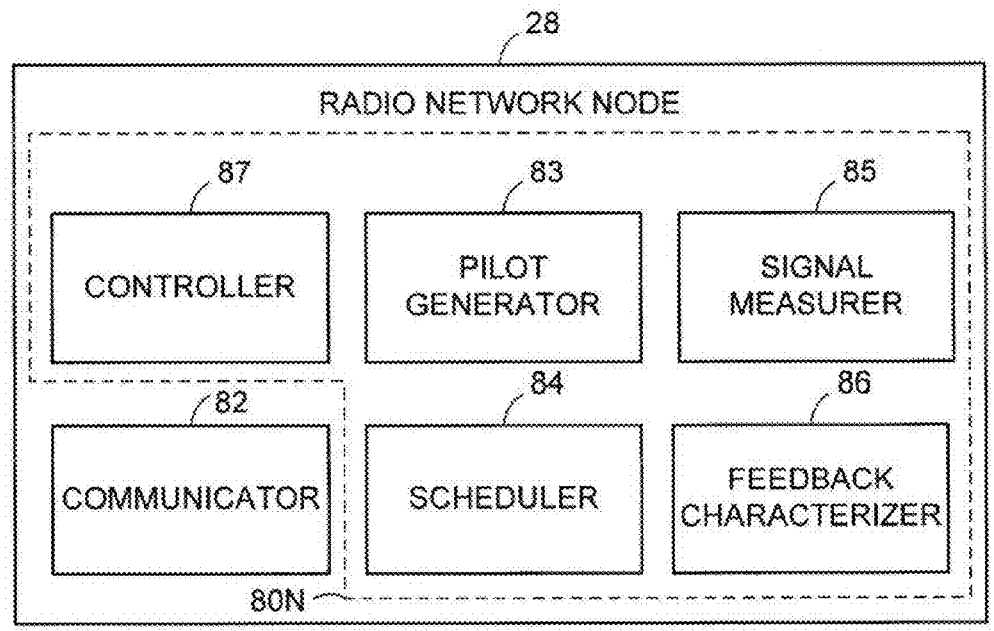
FIG. 10 is a diagrammatic view illustrating example logical components of an example Radio network node.

Constituent units and functionalities of radio network node 28 may be provided, arranged, conceptualized, or configured in various ways. FIG. 10 illustrates a logical view of an example radio network node 28 as comprising communicator 82; pilot generator 83; scheduler 84; signal measurer 85; feedback characterizer 86; and controller 87. The communicator 82 may be structured to communicate with other nodes such as the wireless terminal and to core network nodes. The pilot provider 83 may be structured provide common pilots only or common pilots and additional pilots for data demodulation. The scheduler 84, in conjunction with the signal measurer 85 and/or the feedback characterizer 86, may be structured to determine whether additional pilots are beneficial or necessary, and thus may constitute or be comprised by the aforementioned pilot determination controller 62. The scheduler 84 may also be structured to schedule data transmission to the wireless terminal, the modulation, coding rate, etc., of the data transmission. The signal measurer 85 may be structured to measure uplink signals transmitted from the wireless terminals. The feedback characterizer 86 may be structured to characterize the feedback information provided from the wireless terminals. The controller 87 may be structured to control the overall operations of the radio network node.

Figure 11:
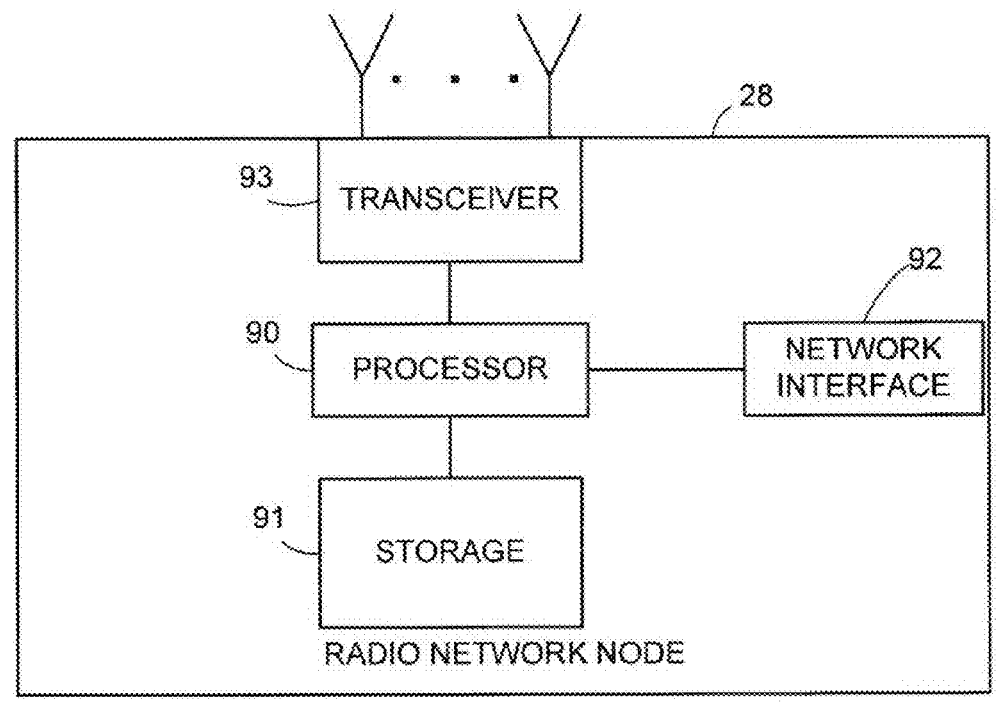
FIG. 11 is a diagrammatic view illustrating example components a radio network node.

FIG. 10 essentially provides a logical view of an example radio network node. It is not necessary that each device be implemented as physically separate modules or circuits. Some or all devices may be combined in a physical module. Also, one or more devices may be implemented in multiple physical modules as illustrated in FIG. 11. FIG. 11 shows the radio network node 28 as comprising physical modules such as processor 90; storage device 91; transceiver 92; and network interface 93.

The devices or modules of the radio network node 28 need not be implemented strictly in hardware. It is envisioned that any of the devices maybe implemented through a combination of hardware and software. For example, the radio network node may include one or more central processing units executing program instructions stored in a non-transitory storage medium or in firmware (e.g., ROM, RAM, Flash) to perform the functions of the devices. The radio network node may also include a transceiver structured to receive wireless signals from the wireless terminals and to send signals to the wireless terminals over one or more antennas in one or more channels. The radio network node may further include a network interface to communicate with other network nodes such as core network nodes.

Figure 12:
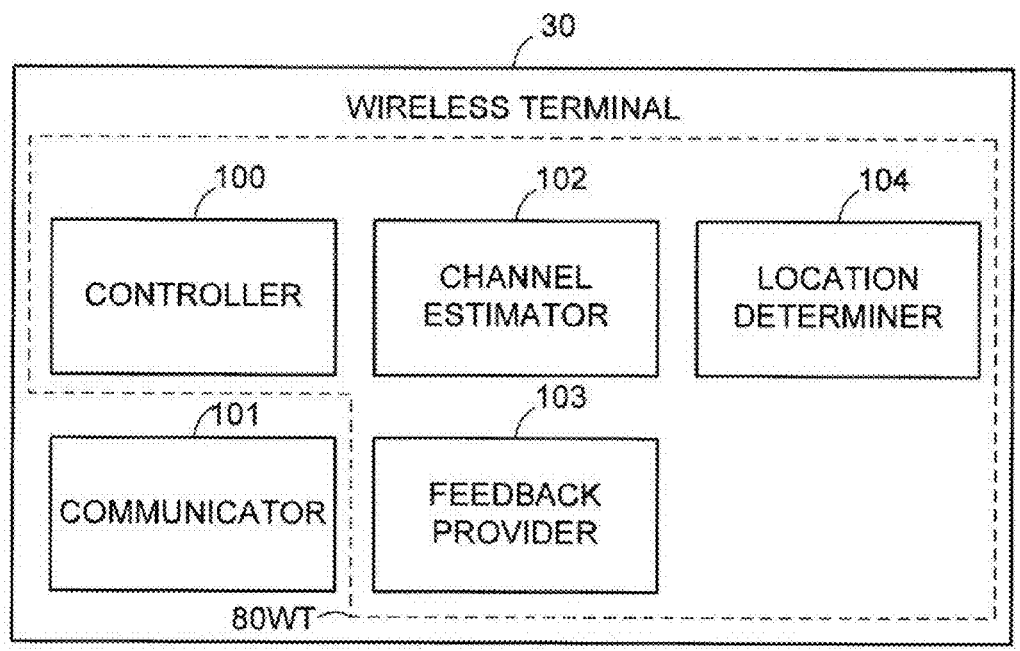
FIG. 12 is a diagrammatic view illustrating example logical components of an example wireless terminal.

Constituent units and functionalities of wireless terminal 30 may be provided, arranged, conceptualized, or configured in various ways. FIG. 12 illustrates a logical view of an example wireless terminal capable of a high degree MIMO (e.g., 4×4 MIMO). The wireless terminal comprises controller 100; communicator 101; channel estimator 102; feedback provider 103; and, location determiner 104. The communicator 101 may be structured to wirelessly communicate with other nodes such as the radio network node through signaling. The channel estimator 102 may be structured to estimate the channels for CSI estimation and/or data demodulation based on the pilots transmitted from the radio network node. The location determiner 104 may be structured to determine the location of the wireless terminal. The feedback provider 103 may be structured to provide feedback such as channel quality information and/or the terminal's location, via the communicator, to the radio network node. The controller 100 may be structured to control the overall operations of the wireless terminal.

Figure 13:
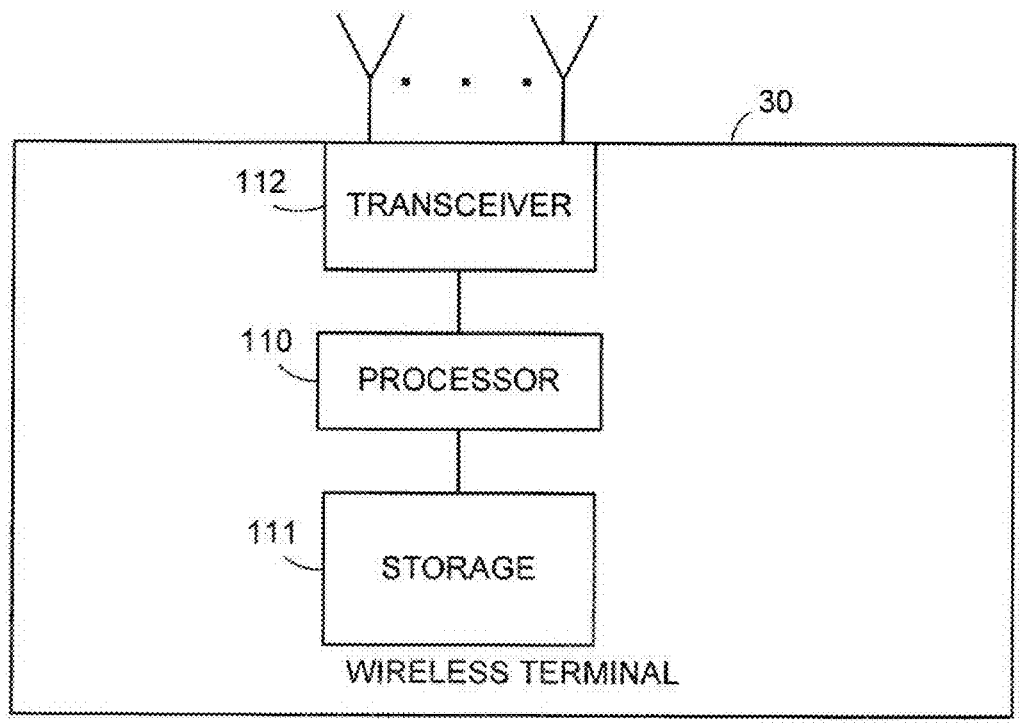
FIG. 13 is a diagrammatic view illustrating example components of an example wireless terminal.

FIG. 12 essentially provides a logical view of an example wireless terminal. It is not necessary that each device be implemented as physically separate modules or circuits. Some or all devices may be combined in a physical module. Also, one or more devices may be implemented in multiple physical modules as illustrated in FIG. 13. FIG. 13 shows the wireless terminal 30 as comprising physical modules such as processor 100; storage device 101; and transceiver 102.

HS-SCCH orders are commands sent to the UE using HS-SCCH. No HS-PDSCH is associated with HS-SCCH orders. The following information is transmitted by means of the HS-SCCH order physical channel.

Extended order type (2 bits) $x_{eodt,1}$, $x_{eodt,2}$
Order type (3 bits): $x_{odt,1}$, $x_{odt,2}$, $x_{odt,3}$
Order (3 bits): $x_{ort,1}$, $x_{ort,2}$, $x_{ort,3}$
UE identity (16 bits): $x_{ue,1}$, $x_{ue,2}$, . . . , $x_{ue,16}$ The Table below illustrates example Orders for activating and de-activating demodulation common pilots (D-CPICH) when the UE is configured in MIMO mode with four transmit antennas. The activation and de-activation status corresponds to individual HS-DSCH cell. Activation and de-activation indication applies for all the demodulation common pilots configured in the cell.

| Extended Order Type $x_{eodt, 1}$, $x_{eodt, 2}$ | Order Type $x_{odt, 1}$, $x_{odt, 2}$, $x_{odt, 3}$ | Order Mapping $x_{ord, 1}$ $x_{ord, 2}$ $x_{ord, 3}$ | | | D-CPICH Activation States A = Activate; D = De-activate |
|---|---|---|---|---|---|
| 11 | 010 | 1 | 1 | 1 | A |
|  |  | 0 | 0 | 0 | D |
|  |  | 0 | 0 | 1 | Unused (Reserved) |
|  |  | 0 | 1 | 0 | Unused (Reserved) |
|  |  | 0 | 1 | 1 | Unused (Reserved) |
|  |  | 1 | 0 | 0 | Unused (Reserved) |
|  |  | 1 | 0 | 1 | Unused (Reserved) |
|  |  | 1 | 1 | 0 | Unused (Reserved) |

The technology disclosed herein provides numerous advantages and benefits. For example, the impact of 4 TX MIMO on legacy terminals arising from the need for additional pilots can be kept on a reasonable level. Further, high power pilots can be provided to the terminal as an aid for data detection.

As used herein, "terminal" or "wireless terminal" or "user equipment (UE)" may be a mobile station such as a mobile telephone or "cellular" telephone or a laptop with wireless capability, e.g., mobile termination, and thus may be, for example, a portable, pocket, hand-held, computer-included, or car-mounted mobile device which communicates voice and/or data via a radio access network. Moreover, a terminal or wireless terminal or UE may be a fixed terminal which communicates voice and/or data via a radio access network.

Although terminologies from 3rd-Generation Partnership Project (3GPP) and 4G are used in this disclosure for explanation purposes, this should not be seen as limiting the scope of the disclosed subject matter to only the aforementioned system. Other wireless systems, such as Worldwide Interoperability for Microwave Access (WiMax), Ultra Mobile Broadband (UMB), Global System for Mobile Communication (GSM) and others may benefit from exploiting the ideas covered within this disclosure.

One or more of the following abbreviations may be utilized herein:
ACK Acknowledgment
CC Chase Combining
CQI Channel Quality Information
CRC Cyclic Redundancy Check
CSI Channel State Information
HARQ Hybrid Automatic Repeat request
HSDPA High Speed Downlink Packet Access
HS-DPCCH High Downlink Physical Control Channel
HS-PDSCH High Speed Physical Downlink Shared Channel
HS-SCCH High Speed Shared Control Channel
IR Incremental Redundancy
MIMO Multiple Input Multiple Output
MMSE Minimum Mean Square Error
NAK Negative ACK
PCI Pre-coding Information
Tri Transmission Time Interval
Tx Transmitter
UE User Equipment Each of the references listed below (cited herein as "Reference [x]", where x corresponds to one of the bracketed numbers below) are incorporated herein by reference in their entirety:

[1] 3GPP TS 25.212 "Multiplexing and channel coding (FDD)", v11.1.0, 2012-03;
[2] 3GPP TS 25.214, "Physical layer procedures (FDD)", v11.0.0, 2011-12;
[3] RP-111393, "New WI: Four Branch MIMO transmission for HSDPA", Ericsson, 3GPP TSG-RAN meeting #53, Fukuoka, Japan, Sep. 13-16, 2011;
[4] R1-111763, "4-branch MIMO for HSDPA", Ericsson, 3GPP TSG-RAN WG1 Meeting #65, Barcelona, Spain, $9^{th}$-$13^{th}$ May, 2011.
[5] R1-120352, "Common Pilot Design for Four branch MIMO System", Ericsson, 3GPP TSG-RAN WG1 Meeting #68, Dresden, Germany, 6-10 Feb., 2012;
[6] R1-122810, "Overall Summary of Pilot Design Schemes in Four branch MIMO System", Ericsson, 3GPP TSG-RAN WG1 Meeting #69, Prague, Czech Republic, $21^{st}$ $25^{th}$ May 2012;
[7] R1-120687, "Further Considerations and Simulations for Pilot Design", Huawei, HiSilicon, 3GPP TSG-RAN WG1 Meeting #68, Dresden, Germany, 6-10 Feb., 2012;
[8] R2-121737, "UE categories for Four Brance MIMO", Ericsson, 3GPP TSG RAN WG2 Meeting #77bis, Jeju, South Korea, 26-30 Mar. 2012;
[9] R1-111336, "LS on further enhancements for CELL_FACH", 3GPP TSG-RAN WG1 Meeting #65, Barcelona, Spain, 9-13 May, 2011;
[10] RP-111375, "HSDPA Multiflow Data Transmission", Qualcomm Inc, Orange, Nokia Siemens Networks, Ericsson, ST-Ericsson, T-Mobile USA, Alcatel-Lucent, Huawei, 3GPP TSG-RAN meeting #53, Fukuoka, Japan, Sep. 13-16, 2011;
[11] RP-111642, "MIMO with 64QAM for HSUPA", Nokia Siemens Networks, 3GPP TSG-RAN meeting #54, Berlin, Germany, Dec. 6-9, 2011;
[12] U.S. Provisional Application 61/646,066, "METHOD AND APPARATUS FOR TRANSMITTING DEMODULATION PILOTS IN A MULTI ANTENNA WIRELESS COMMUNICATION SYSTEM", filed May 11, 2012;
[13] U.S. Provisional Application 61/646,129, "METHOD AND APPARATUS FOR DETECTING PILOT CONFIGURATION IN A MULTI ANTENNA WIRELESS COMMUNICATION SYSTEM", filed May 11, 2012;
[14] U.S. Provisional Application 61/650,784, "METHOD AND APPARATUS FOR COMPUTING CHANNEL STATE INFORMATION WITH MULTIPLE PILOTS IN A MULTI ANTENNA WIRELESS COMMUNICATION SYSTEM", filed May 23, 2012.

Although the description above contains many specificities, these should not be construed as limiting the scope of the technology disclosed herein but as merely providing illustrations of some of the presently preferred embodiments of the technology disclosed herein. The scope of the technology disclosed herein fully encompasses other embodiments which may become obvious to those skilled in the art, and that the scope of the technology disclosed herein is accordingly not to be unduly limited. Reference to an element in the singular is not intended to mean "one and only one" unless explicitly so stated, but rather "one or more." All structural and functional equivalents to the elements of the above-described preferred embodiment that are known to those of ordinary skill in the art are expressly encompassed herein. Moreover, it is not necessary for a device or method to address each and every problem sought to be solved by the technology disclosed herein, for it to be encompassed hereby.

What is claimed is:

1. A radio network node comprising:
   a transmitter and receiver configured to communicate over an air interface with a wireless terminal;
   electronic circuitry configured to schedule pilot signals, including common pilot signals transmitted for channel estimation, for transmission over the air interface to the wireless terminal, the electronic circuitry being configured to make a determination whether additional pilot signals for data demodulation are also to be transmitted to the wireless terminal in addition to the common pilot signals transmitted for the channel estimation, wherein the determination is based on at least modulation rate and code rate assigned to one or more wireless terminals served by the radio network node;
   the electronic circuitry further configured to transmit to the wireless terminal an order signal that the additional pilot signals for data demodulation are to be transmitted to the wireless terminal; and
   the electronic circuitry further configured to transmit to the wireless terminal the additional pilot signals for data demodulation upon receiving from the wireless terminal an acknowledgement of the order signal.

2. The radio network node of claim 1, wherein the electronic circuitry is configured to make the determination based on location of one or more wireless terminals served by the radio network node.

3. The radio network node of claim 1, wherein the electronic circuitry is configured to make the determination based on downlink channel quality information for one or more wireless terminals served by the radio network node.

4. The radio network node of claim 1, wherein the electronic circuitry is configured to make the determination based on uplink signal strength of an uplink signal transmitted from one or more wireless terminals served by the radio network node.

5. The radio network node of claim 1, wherein the radio network node is configured to transmit the order signal to the wireless terminal over a High Speed Shared Control Channel (HS-SCCH) the determination that the additional pilot signals for data demodulation are also to be transmitted to the wireless terminal.

6. The radio network node of claim 1, wherein the scheduler is configured to schedule the additional pilot signals for data demodulation for transmission to the wireless terminal on a High Speed Physical Downlink Shared Channel (HS-PDSCH).

7. The radio network node of claim 1, wherein the electronic circuitry is configured to make a separate determination with respect to each of plural wireless terminals whether the order signal is to be transmitted to the respective wireless terminal.

8. The radio network node of claim 7, wherein the electronic circuitry is configured to make the separate determination with respect to each of the plural wireless terminals based on respective different criteria.

9. The radio network node of claim 8, wherein the different criteria comprises one or more of:
   (a) location of one or more wireless terminals served by the radio network node;
   (b) downlink channel quality information for one or more wireless terminals served by the radio network node;
   (c) an uplink signal transmitted from one or more wireless terminals served by the radio network node; and
   (d) modulation rate and code rate assigned to one or more wireless terminals served by the radio network node.

10. The radio network node of claim 1, wherein the electronic circuitry is configured to make a collective determination whether the additional pilot signals for data demodulation are to be transmitted to plural wireless terminals served by the radio network node, the collective determination being based on the plural separate determinations made with respect to each of the plural wireless terminals.

11. The radio network node of claim 1, wherein the electronic circuitry is configured to make a collective determination whether the additional pilot signals for data demodulation are to be transmitted to plural wireless terminals served by the radio network node, the collective determination being based on a tradeoff of benefit against detriment of use of the additional pilots for data demodulation by the plural wireless terminals.

12. A wireless terminal comprising:
   a transmitter and receiver configured to communicate over an air interface with a radio network node;
   electronic circuitry configured to make a determination regarding which pilot signals transmitted by the radio network node are to be utilized by the wireless terminal for demodulation, the pilot signals transmitted by the radio network node including common pilot signals transmitted for channel estimation and additional pilot signals transmitted for data demodulation, wherein the determination is based on at least modulation rate and code rate assigned to one or more wireless terminals served by the radio network node;
   wherein the wireless terminal is configured to receive an order signal indicating that the additional pilot signals for data demodulation are to be transmitted to the wireless terminal; and
   wherein the wireless terminal is configured to signal an acknowledgement of the order signal when the wireless terminal is to use the additional pilot signals for demodulation.

13. The wireless terminal of claim 12, wherein the electronic circuitry is configured to make the determination based on reception capability of the wireless terminal.

14. The wireless terminal of claim 12, wherein the electronic circuitry is configured to make the determination based on cost of usage of the additional pilot signals transmitted for data demodulation.

15. A method in a radio network node, the radio network node configured to communicate over an air interface with a wireless terminal, the method comprising:
   scheduling pilot signals, including common pilot signals transmitted for channel estimation, for transmission over the air interface to the wireless terminal;
   making a determination whether additional pilot signals for data demodulation are also to be transmitted to the wireless terminal in addition to the common pilot signals transmitted for the channel estimation, wherein the determination is based on at least modulation rate and code rate assigned to one or more wireless terminals served by the radio network node;

transmitting to the wireless terminal an order signal that the additional pilot signals for data demodulation are also to be transmitted to the wireless terminal; and transmitting to the wireless terminal the additional pilot signals for data demodulation upon receiving from the wireless terminal an acknowledgement of the order signal.

16. The method of claim 15, further comprising making the determination based on location of one or more wireless terminals served by the radio network node.

17. The method of claim 15, further comprising making the determination based on downlink channel quality information for one or more wireless terminals served by the radio network node.

18. The method of claim 15, further comprising making the determination based on uplink signal strength of an uplink signal transmitted from one or more wireless terminals served by the radio network node.

19. The method of claim 15, further comprising transmitting the order signal to the wireless terminal over a High Speed Shared Control Channel (HS-SCCH) the determination that the additional pilot signals for data demodulation are also to be transmitted to the wireless terminal.

20. The method of claim 15, further comprising scheduling the additional pilot signals for data demodulation for transmission to the wireless terminal on a High Speed Physical Downlink Shared Channel (HS-PDSCH).

21. The method of claim 15, further comprising making a separate determination with respect to each of plural wireless terminals whether an order signal is to be transmitted for the respective wireless terminal.

22. The method of claim 21, further comprising making the separate determination with respect to each of the plural wireless terminals based on respective different criteria.

23. The method of claim 22, wherein the different criteria comprises one or more of:
   (a) location of one or more wireless terminals served by the radio network node;
   (b) downlink channel quality information for one or more wireless terminals served by the radio network node;
   (c) an uplink signal transmitted from one or more wireless terminals served by the radio network node; and
   (d) modulation rate and code rate assigned to one or more wireless terminals served by the radio network node.

24. The method of claim 15, further comprising making a collective determination whether the additional pilot signals for data demodulation are to be transmitted to plural wireless terminals served by the radio network node, the collective determination being based on the plural separate determinations made with respect to each of the plural wireless terminals.

25. The method of claim 15, further comprising making a collective determination whether the additional pilot signals for data demodulation are to be transmitted to plural wireless terminals served by the radio network node, the collective determination being based on a tradeoff of benefit against detriment of use of the additional pilots for data demodulation by the plural wireless terminals.

26. A method in a wireless terminal which communicates over an air interface with a radio network node, the method comprising:
   receiving an order signal indicating that additional pilot signals for data demodulation are to be transmitted to the wireless terminal;
   making a determination regarding which pilot signals transmitted by the radio network node are to be utilized by the wireless terminal, the pilot signals transmitted by the radio network node including common pilot signals transmitted for channel estimation and additional pilot signals transmitted for data demodulation, wherein the determination is based on at least modulation rate and code rate assigned to one or more wireless terminals served by the radio network node; and
   signaling an acknowledgement of the order signal when the wireless terminal is to use the additional pilot signals for demodulation.

27. The method of claim 26, further comprising making the determination based on reception capability of the wireless terminal.

28. The method of claim 26, further comprising making the determination based on cost of usage of the additional pilot signals transmitted for data demodulation.

* * * * *